US010460406B1

(12) United States Patent
Humphries et al.

(10) Patent No.: US 10,460,406 B1
(45) Date of Patent: Oct. 29, 2019

(54) AUTOMATICALLY DETERMINING MARKET RENTAL RATES FOR PROPERTIES

(75) Inventors: Stanley B. Humphries, Sammamish, WA (US); Dong Xiang, Sammamish, WA (US); Yeng Bun, Seattle, WA (US)

(73) Assignee: Zillow, Inc., Seattle, WA (US)

( * ) Notice: Subject to any disclaimer, the term of this patent is extended or adjusted under 35 U.S.C. 154(b) by 189 days.

(21) Appl. No.: 13/044,480

(22) Filed: Mar. 9, 2011

(51) Int. Cl.
*G06Q 50/16* (2012.01)
*G06Q 30/06* (2012.01)

(52) U.S. Cl.
CPC ......... *G06Q 50/16* (2013.01); *G06Q 30/0645* (2013.01); *G06Q 50/163* (2013.01)

(58) Field of Classification Search
CPC .... G06Q 30/0278; G06Q 50/16; G06Q 30/02; G06Q 30/0283; G06Q 40/00; G06Q 50/163; G06Q 30/0645
USPC .................................................. 705/306, 313
See application file for complete search history.

(56) References Cited

U.S. PATENT DOCUMENTS

| 4,870,576 A | 9/1989 | Tornetta |
| 5,361,201 A | 11/1994 | Jost et al. |
| 5,414,621 A | 5/1995 | Hough |
| 5,584,025 A | 12/1996 | Keithley et al. |
| 5,680,305 A | 10/1997 | Apgar, IV |
| 5,754,850 A | 5/1998 | Janssen |
| 5,794,216 A | 8/1998 | Brown |
| 5,855,011 A | 12/1998 | Tatsuoka |
| 5,857,174 A | 1/1999 | Dugan |
| 6,115,694 A | 9/2000 | Cheetham et al. |
| 6,178,406 B1 | 1/2001 | Cheetham et al. |
| 6,240,425 B1 | 5/2001 | Naughton |
| 6,260,033 B1 | 7/2001 | Tatsuoka |
| 6,301,571 B1 | 10/2001 | Tatsuoka |
| 6,397,208 B1 | 5/2002 | Lee |
| 6,401,070 B1 | 6/2002 | McManus et al. |
| 6,446,261 B1 | 9/2002 | Rosser |

(Continued)

FOREIGN PATENT DOCUMENTS

| EP | 1903491 A1 | 3/2008 |
| WO | WO-199524687 | 9/1995 |

(Continued)

OTHER PUBLICATIONS

Melville, Jennifer, "How Much Should I Charge to Rent My House?", published Dec. 5, 2010, retrieved from http://homeguides.sfgate.com/much-should-charge-rent-house-8314.html on Aug. 11, 2016, pp. 2.*

(Continued)

*Primary Examiner* — Carrie S Gilkey
(74) *Attorney, Agent, or Firm* — Perkins Coie LLP

(57) ABSTRACT

A facility for determining a market rental rate for a distinguished home located in a distinguished geographic area is described. The facility receives home attributes for the distinguished home. The facility obtains a market rental rate for the distinguished home by applying to the received home attributes a valuation model for homes in the distinguished geographic area that has been trained using rental listing price and home attribute data from homes recently listed for rental in the distinguished geographic area. The facility reports the obtained market rental rate for the distinguished home.

21 Claims, 14 Drawing Sheets

(56) References Cited

U.S. PATENT DOCUMENTS

| | | | |
|---|---|---|---|
| 6,493,721 B1* | 12/2002 | Getchius | G06Q 30/02 |
| 6,597,983 B2 | 7/2003 | Hancock | |
| 6,609,118 B1 | 8/2003 | Khedkar et al. | |
| 6,615,187 B1 | 9/2003 | Ashenmil | |
| 6,876,955 B1 | 4/2005 | Fleming et al. | |
| 6,877,015 B1 | 4/2005 | Kilgore et al. | |
| 6,915,206 B2 | 7/2005 | Sasajima | |
| 7,092,918 B1 | 8/2006 | Delurgio et al. | |
| 7,130,810 B2 | 10/2006 | Foster et al. | |
| 7,289,965 B1 | 10/2007 | Bradley et al. | |
| 7,461,265 B2 | 12/2008 | Ellmore | |
| 7,487,114 B2 | 2/2009 | Florance et al. | |
| 7,567,262 B1 | 7/2009 | Clemens et al. | |
| 7,711,574 B1 | 5/2010 | Bradley et al. | |
| 7,725,359 B1 | 5/2010 | Katzfey et al. | |
| 7,783,562 B1 | 8/2010 | Ellis | |
| 7,788,186 B1 | 8/2010 | An et al. | |
| 7,827,128 B1 | 11/2010 | Yan et al. | |
| 7,848,966 B2 | 12/2010 | Charuk et al. | |
| 7,933,798 B1 | 4/2011 | Yan et al. | |
| 7,970,674 B2 | 6/2011 | Cheng et al. | |
| 8,051,089 B2 | 11/2011 | Gargi et al. | |
| 8,095,434 B1 | 1/2012 | Puttick et al. | |
| 8,370,267 B2 | 2/2013 | Carey et al. | |
| 8,401,877 B2 | 3/2013 | Salvagio | |
| 8,473,347 B1 | 6/2013 | Koningstein | |
| 8,583,562 B1 | 11/2013 | McDaniel et al. | |
| 8,628,151 B1 | 1/2014 | Allen et al. | |
| 8,650,067 B1 | 2/2014 | Moss et al. | |
| 8,660,919 B2 | 2/2014 | Kasower | |
| 8,775,300 B2 | 7/2014 | Showalter | |
| 9,536,011 B1 | 1/2017 | Kirillov | |
| 2001/0039506 A1 | 11/2001 | Robbins | |
| 2001/0044766 A1 | 11/2001 | Keyes | |
| 2002/0035520 A1 | 3/2002 | Weiss | |
| 2002/0082903 A1 | 6/2002 | Yasuzawa | |
| 2002/0087389 A1 | 7/2002 | Sklarz et al. | |
| 2002/0184117 A1 | 12/2002 | Provost | |
| 2002/0188689 A1 | 12/2002 | Michael | |
| 2003/0004781 A1 | 1/2003 | Mallon et al. | |
| 2003/0046099 A1 | 3/2003 | Lamont et al. | |
| 2003/0046211 A1 | 3/2003 | Brecher | |
| 2003/0078878 A1 | 4/2003 | Opsahl-Ong | |
| 2003/0078897 A1 | 4/2003 | Florance et al. | |
| 2003/0101063 A1 | 5/2003 | Sexton et al. | |
| 2003/0101074 A1 | 5/2003 | Suzuki et al. | |
| 2003/0110122 A1 | 6/2003 | Nalebuff et al. | |
| 2003/0149658 A1 | 8/2003 | Rossbach et al. | |
| 2003/0187714 A1 | 10/2003 | Perry et al. | |
| 2003/0191723 A1 | 10/2003 | Foretich et al. | |
| 2003/0212565 A1 | 11/2003 | Badali et al. | |
| 2004/0019517 A1 | 1/2004 | Sennott | |
| 2004/0030616 A1 | 2/2004 | Florance et al. | |
| 2004/0039629 A1 | 2/2004 | Hoffman et al. | |
| 2004/0049440 A1 | 3/2004 | Shinoda et al. | |
| 2004/0054605 A1 | 3/2004 | Whittet | |
| 2004/0093270 A1 | 5/2004 | Gilbert | |
| 2004/0128215 A1 | 7/2004 | Florance et al. | |
| 2004/0153330 A1 | 8/2004 | Miller et al. | |
| 2004/0220872 A1 | 11/2004 | Pollock | |
| 2004/0243470 A1 | 12/2004 | Ozer et al. | |
| 2004/0254803 A1 | 12/2004 | Myr | |
| 2005/0071376 A1 | 3/2005 | Modi | |
| 2005/0080702 A1 | 4/2005 | Modi | |
| 2005/0108084 A1 | 5/2005 | Ramamoorti et al. | |
| 2005/0154656 A1 | 7/2005 | Kim et al. | |
| 2005/0154657 A1 | 7/2005 | Kim et al. | |
| 2005/0187778 A1 | 8/2005 | Mitchell | |
| 2005/0240429 A1 | 10/2005 | Dieden et al. | |
| 2005/0254803 A1 | 11/2005 | Ono | |
| 2005/0288942 A1* | 12/2005 | Graboske et al. | 705/1 |
| 2005/0288957 A1 | 12/2005 | Eraker et al. | |
| 2006/0015357 A1 | 1/2006 | Cagan | |
| 2006/0020424 A1 | 1/2006 | Quindel | |
| 2006/0080114 A1 | 4/2006 | Bakes et al. | |
| 2006/0085210 A1 | 4/2006 | Owens | |
| 2006/0089842 A1 | 4/2006 | Medawar | |
| 2006/0105342 A1 | 5/2006 | Villena et al. | |
| 2006/0122918 A1* | 6/2006 | Graboske et al. | 705/30 |
| 2006/0167710 A1 | 7/2006 | King et al. | |
| 2006/0248555 A1 | 11/2006 | Eldering | |
| 2007/0005373 A1 | 1/2007 | Villena et al. | |
| 2007/0043770 A1 | 2/2007 | Goodrich et al. | |
| 2007/0050342 A1 | 3/2007 | Inkinen et al. | |
| 2007/0067180 A1 | 3/2007 | James et al. | |
| 2007/0106523 A1 | 5/2007 | Eaton et al. | |
| 2007/0124235 A1 | 5/2007 | Chakraborty et al. | |
| 2007/0132727 A1 | 6/2007 | Garbow et al. | |
| 2007/0143132 A1 | 6/2007 | Linne et al. | |
| 2007/0143312 A1 | 6/2007 | Wiseman | |
| 2007/0150353 A1 | 6/2007 | Krassner | |
| 2007/0185727 A1 | 8/2007 | Ma et al. | |
| 2007/0185906 A1* | 8/2007 | Humphries et al. | 707/104.1 |
| 2007/0198278 A1* | 8/2007 | Cheng et al. | 705/1 |
| 2007/0244780 A1* | 10/2007 | Liu | G06Q 40/00 705/35 |
| 2007/0255581 A1 | 11/2007 | Otto et al. | |
| 2008/0004893 A1 | 1/2008 | Graboske et al. | |
| 2008/0015890 A1 | 1/2008 | Malyala | |
| 2008/0077458 A1 | 3/2008 | Andersen et al. | |
| 2008/0086356 A1 | 4/2008 | Glassman et al. | |
| 2008/0097767 A1 | 4/2008 | Milman et al. | |
| 2008/0109409 A1 | 5/2008 | Hengel | |
| 2008/0133319 A1 | 6/2008 | Adiga et al. | |
| 2008/0255921 A1 | 10/2008 | Flake et al. | |
| 2008/0288335 A1 | 11/2008 | Goldberg | |
| 2008/0301064 A1* | 12/2008 | Burns | 705/400 |
| 2009/0006185 A1 | 1/2009 | Stinson | |
| 2009/0024491 A1 | 1/2009 | Choubey | |
| 2009/0030707 A1 | 1/2009 | Green | |
| 2009/0030864 A1 | 1/2009 | Pednault et al. | |
| 2009/0037328 A1 | 2/2009 | Abuaf | |
| 2009/0043603 A1 | 2/2009 | Rutherford et al. | |
| 2009/0043637 A1 | 2/2009 | Eder | |
| 2009/0048938 A1 | 2/2009 | Dupray | |
| 2009/0076902 A1 | 3/2009 | Grinsted et al. | |
| 2009/0132316 A1 | 5/2009 | Florance et al. | |
| 2009/0144097 A1 | 6/2009 | Fassio et al. | |
| 2009/0150216 A1 | 6/2009 | Milman et al. | |
| 2009/0164464 A1 | 6/2009 | Carrico et al. | |
| 2009/0210287 A1 | 8/2009 | Chickering et al. | |
| 2009/0240586 A1 | 9/2009 | Ramer et al. | |
| 2009/0265285 A1 | 10/2009 | Balaishis | |
| 2010/0005019 A1 | 1/2010 | Yang et al. | |
| 2010/0023379 A1 | 1/2010 | Rappaport | |
| 2010/0076881 A1 | 3/2010 | O'Grady | |
| 2010/0094548 A1 | 4/2010 | Tadman et al. | |
| 2010/0114678 A1 | 5/2010 | Axe et al. | |
| 2010/0161498 A1 | 6/2010 | Walker | |
| 2010/0318451 A1 | 12/2010 | Niccolini | |
| 2011/0066510 A1 | 3/2011 | Talegon | |
| 2011/0066561 A1 | 3/2011 | Lazarre et al. | |
| 2011/0071899 A1 | 3/2011 | Robertson et al. | |
| 2011/0178920 A1 | 7/2011 | Ghosh et al. | |
| 2011/0196762 A1 | 8/2011 | DuPont | |
| 2011/0218934 A1 | 9/2011 | Elser | |
| 2011/0218937 A1 | 9/2011 | Elser | |
| 2011/0251967 A1 | 10/2011 | Klivington | |
| 2011/0251974 A1 | 10/2011 | Woodard et al. | |
| 2011/0270779 A1 | 11/2011 | Showalter | |
| 2011/0288981 A1 | 11/2011 | Frischer | |
| 2012/0005111 A2 | 1/2012 | Mr. Lowenstein et al. | |
| 2012/0011075 A1 | 1/2012 | Graboske et al. | |
| 2012/0030092 A1 | 2/2012 | Marshall et al. | |
| 2012/0072357 A1 | 3/2012 | Bradford et al. | |
| 2012/0078770 A1 | 3/2012 | Hecht | |
| 2012/0158459 A1 | 6/2012 | Villena et al. | |
| 2012/0191541 A1 | 7/2012 | Yang et al. | |
| 2012/0254045 A1 | 10/2012 | Orfano | |
| 2012/0311431 A1 | 12/2012 | Breaker et al. | |
| 2012/0323798 A1 | 12/2012 | Den Herder et al. | |
| 2013/0103459 A1 | 4/2013 | Marshall et al. | |
| 2013/0159166 A1 | 6/2013 | Irick | |
| 2013/0332877 A1 | 12/2013 | Florance et al. | |

(56) References Cited

U.S. PATENT DOCUMENTS

| | | |
|---|---|---|
| 2013/0339255 A1 | 12/2013 | Talbird |
| 2014/0012720 A1 | 1/2014 | O'Kane |
| 2014/0257924 A1 | 9/2014 | Xie |
| 2014/0279692 A1 | 9/2014 | Boothby et al. |
| 2014/0316857 A1 | 10/2014 | Roberts |
| 2014/0372203 A1 | 12/2014 | Powell et al. |
| 2015/0149275 A1 | 5/2015 | Bax et al. |
| 2015/0356576 A1 | 12/2015 | Malaviya et al. |

FOREIGN PATENT DOCUMENTS

| | | |
|---|---|---|
| WO | WO-2000055771 | 9/2000 |
| WO | WO-200211038 | 2/2002 |
| WO | WO-2002042980 | 5/2002 |
| WO | WO-2003100692 | 12/2003 |
| WO | WO-2005015441 A2 | 2/2005 |
| WO | WO-2006025830 | 3/2006 |
| WO | 2006043951 | 4/2006 |
| WO | WO-2007051892 | 5/2007 |

OTHER PUBLICATIONS

Quirk, Bill, "Zilpy.com Launches a Rental Data Website Built in Partnership with Zillow!!!", published Jan. 29, 2008, retrieved from http://www.propertymanagementmavens.com/archives/2008/1 on Aug. 11, 2016, pp. 3.*
Inman, "Zilpy, the new 'Z' site in online real estate", published Feb. 7, 2008, retrieved from http://www.inman.com/2008/02/07/zilpy-new-z-site-in-online-real-estate/ on Aug. 11, 2016, pp. 2.*
U.S. Appl. No. 11/971,758, filed Jan. 9, 2008, Humphries et al.
Centre for Mathmatical Sciences, Lund University, "Classification and Regression with Random Forest," http://web.archive.org/web/20060205051957/http://www.maths.lth.se/help/R/.R/library/randomForest/html/randomForest.html, pp. 1-4 [internet archive date: Feb. 5, 2006].
www.cran.r-project.org, "The Comprehensive R Archive Network," http://web.archive.org/web/20050830073913/cran.r-project.org/banner.shtml, pp. 1-2 [internet archive date: Aug. 30, 2005].
U.S. Appl. No. 11/927,623, filed Oct. 29, 2007, Humphries et al.
U.S. Appl. No. 13/044,490, filed Mar. 9, 2011, Humphries et al.
U.S. Appl. No. 13/417,804, filed Mar. 12, 2012, Humphries et al.
U.S. Appl. No. 13/828,680, filed Mar. 14, 2013, Humphries et al.
"An Introduction to R," <http://web.archive.org/web/20060118050840/http://cran.r-project.org/doc/manuals/R-intro.html>, [internet archive date: Jan. 18, 2006], pp. 1-105.
"Centre for Mathematical Sciences," Lund University, http://web.archive.org/web/20060101005103/http://www.maths.lth.se/, [internet archive date: Jan. 1, 2006], 1 page.
"The R Project for Statistical Computing," www.r-project.org, http://web.archive.org/web/20060102073515/www.r-project.org/main.shtml, [internet archive date: Jan. 2, 2006], 1 page.
Appeal Brief for U.S. Appl. No. 11/524,048, Aug. 9, 2010, 20 pages.
Bailey, Martin J. et al., A Regression Method for Real Estate Price Index Construction, Journal of the American Statistical Association, vol. 58, No. 304 (Dec. 1963), Published by: American Statistical Association, Stable URL: http://www.jstor.org/stable/2283324, pp. 933-942, 11 pages.
Bennett, Kristin P., "Support Vector Machines: Hype or Hallelujah?" SIGKDD Explorations, Dec. 2000, vol. 2, issue 2, ACM SIGKDD, pp. 1-12.
Boston Housing Data, http://www.ics.uci.edu/~mlearn/databases/housing/housing.names, [accessed Dec. 13, 2005], 1 page.
Breiman et al., "Random Forest," Classification Description, http://www.stat.berkeley.edu/users/breiman/RandomForests/cc_home.htm, [accessed Dec. 13, 2005], pp. 1-28.
Breiman, L., "Random Forests," Machine Learning, 45, 2001, Kluwer Academic Publishers, The Netherlands, pp. 5-32.
Breiman, Leo et al., Random Forests, R Mathematical Software Package, licensed by Salford Systems, available at URL cran.r-project.org, and described at "Package 'randomForest'", version 4.6-7, Feb. 15, 2013, Published Oct. 16, 2012, available at URL cran.r-project.org/web/packages/randomforest/randomForest.pdf., 29 pages.
Case, Karl E., et al., "Prices of Single Family Homes Since 1970: New Indexes for Four Cities," Cowles Foundation for Research in Economics at Yale University, New Haven, Connecticut, Discussion Paper No. 851, Oct. 1987, 54 pages.
Decision—Institution of Inter Partes Review for U.S. Pat. No. 7,970,674, Case No. IPR2013-00034, Apr. 2, 2013, 28 pages.
Decision on Appeal for U.S. Appl. No. 11/524,048, Mail Date Oct. 19, 2012, 7 pages.
Decision on Request for Rehearing for U.S. Pat. No. 7,970,674, Case No. IPR2013-00034, Apr. 22, 2013, 5 pages.
European Examination Report, Application No. 07018380.1, dated May 16, 2013, 6 pages.
European Examination Report, Application No. 07018380.1, dated Nov. 8, 2012, 6 pages.
Examiner's Answer for U.S. Appl. No. 11/524,048, dated Oct. 28, 2010, 13 pages.
Final Office Action for U.S. Appl. No. 11/347,000, dated Jan. 3, 2012, 17 pages.
Final Office Action for U.S. Appl. No. 11/347,024, dated Feb. 3, 2011, 28 pages.
Final Office Action for U.S. Appl. No. 11/524,047, dated Jul. 23, 2010, 7 pages.
Final Office Action for U.S. Appl. No. 11/524,047, dated Sep. 28, 2012, 8 pages.
Final Office Action for U.S. Appl. No. 11/524,048, dated Dec. 8, 2009, 11 pages.
Final Office Action for U.S. Appl. No. 11/927,623, dated Sep. 19, 2011, 9 pages.
Hill, T. and Lewicki, P., "K-Nearest Neighbors," Statistics Methods and Applications, 2007, http://www.statsoft.com/textbook/stknn.html, [internet accessed on [Dec. 6, 2007], 5 pages.
Internal Revenue Service Publication 946, "How to Depreciate Property," 2004, 112 pages.
Meyer, Robert T., "The Learning of Multiattribute Judgment Policies," The Journal of Consumer Research, vol. 14, No. 2, Sep. 1987, 20 pages.
Mobasher, B. "Classification via Decision Trees in WEKA," DePaul University, Computer Science, Telecommunications, and Information Systems, ECT 584-Web Data Mining, 2005, http://maya.cs.depaul.edu/~classes/Ect584/WEKA/classify.html, [internet accessed on Dec. 6, 2007], 5 pages.
Motion for *Pro Hac Vice* Admission and Exhibit A for U.S. Pat. No. 7,970,674, Case No. IPR2013-00034, Filing Date Dec. 17, 2012, 13 pages.
Non-Final Office Action for U.S. Appl. No. 11/347,000, dated Oct. 27, 2010, 23 pages.
Non-Final Office Action for U.S. Appl. No. 11/347,000, dated Nov. 23, 2012, 6 pages.
Non-Final Office Action for U.S. Appl. No. 11/347,000, dated Apr. 9, 2010, 18 pages.
Non-Final Office Action for U.S. Appl. No. 11/347,000, dated May 27, 2011, 13 pages.
Non-Final Office Action for U.S. Appl. No. 11/347,024, dated Dec. 10, 2009, 45 pages.
Non-Final Office Action for U.S. Appl. No. 11/347,024, dated May 13, 2010, 33 pages.
Non-Final Office Action for U.S. Appl. No. 11/524,047, dated May 7, 2012, 8 pages.
Non-Final Office Action for U.S. Appl. No. 11/524,047, dated Oct. 28, 2009, 8 pages.
Non-Final Office Action for U.S. Appl. No. 11/524,047, dated Jul. 8, 2011, 7 pages.
Non-Final Office Action for U.S. Appl. No. 11/524,048, dated Apr. 29, 2009, 10 pages.
Non-Final Office Action for U.S. Appl. No. 11/927,623, dated Dec. 28, 2010, 10 pages.
Non-Final Office Action for U.S. Appl. No. 11/971,758, dated Feb. 2, 2011, 22 pages.

(56) References Cited

OTHER PUBLICATIONS

Notice of Allowance for U.S. Appl. No. 11/347,024, dated Apr. 18, 2011, 7 pages.
Notice of Allowance for U.S. Appl. No. 11/524,048, dated Feb. 25, 2013, 14 pages.
Notice of Allowance for U.S. Appl. No. 11/971,758, dated Nov. 10, 2011, 12 pages.
Order Authorizing Motion for *Pro Hac Vice* Admission for U.S. Pat. No. 7,970,674, Case No. IPR2013-00034, Filing Date Jan. 3, 2013, 4 pages.
Patent Owner's Response to Revised Petition for Inter Partes Review for U.S. Pat. No. 7,970,674, Case No. IPR2013-00034, Jun. 14, 2013, 41 pages.
Petition for Inter Partes Review for U.S. Pat. No. 7,970,674, Case No. IPR2013-00034, Mail Date Oct. 26, 2012, 65 pages.
Prasad, Nalini et al., "Measuring Housing Price Growth—Using Stratification to Improve Median-based Measures", Reserve Bank of Australia, 2006, p. 1.
Preliminary Patent Owner Response and Exhibits for U.S. Pat. No. 7,970,674, Case No. IPR2013-00034, Feb. 15, 2013, 228 pages.
Real-info.com, "What is an AVM," www.real-info.com/products_avm.asp? Internet Archive Date: Oct. 30, 2005, [accessed Mar. 21, 2007], 5 pages.
RealEstateABC.com, see paragraph headed "How do I make the estimate more accurate?" www.realestateabc.com/home-values/ <http://www.realestateabc.com/home-values/>, Internet Archive Dated: Apr. 5, 2006, [accessed Mar. 20, 2007], 4 pages.
Reply Brief for U.S. Appl. No. 11/524,048, dated Dec. 22, 2010, 6 pages.
Request for Rehearing for U.S. Pat. No. 7,970,674, Case No. IPR2013-00034, Apr. 16, 2013, 8 pages.
Response to Decision on Appeal for U.S. Appl. No. 11/524,048, dated Dec. 19, 2012, 7 pages.
Revised Petition for Inter Partes Review for U.S. Pat. No. 7,970,674, Case No. IPR2013-00034, Mail Date Nov. 13, 2012, 55 pages.
Standard & Poors, "Guidelines for the use of Automated Valuation Models for U.K. RMBS Transactions," http://www.rics.org/NR/rdonlyres/8Fcdd20c-7FAC-4549-86FB-3930CDOCBC05/0/StandardandPoorsReportonAVMs.pdf, Published Feb. 20, 2004, 4 pages.
StatSoft, Inc., "Classification Trees," http://www.statsoft.com/textbook/stclatre.html, ã1984-2003 [accessed Dec. 13, 2005], pp. 1-20.
Svetnik et al., "Random Forest: A Classification and Regression Tool for Compound Classification and QSAR Modeling", J Chem Info. Computer Science, vol. 43, 2003, pp. 1947-1958.
Tay et al., "Artificial Intelligence and the Mass Appraisal of Residential Apartments," Journal of Property Valuation and Investment, Feb. 1, 1992, 17 pages.
Vapnik et al., "Support-Vector Networks," Machine Learning, vol. 20, 1995, 25 pages.
Quinlan, Ross J., "C4.5: Programs for Machine Learning," Machine Learning, 1993, Morgan Kaufmann Publishers, San Francisco, CA, USA., 302 pages.
Non-Final Office Action for U.S. Appl. No. 13/044,490, dated Oct. 11, 2012, 30 pages.
Final Office Action for U.S. Appl. No. 13/044,490, dated Mar. 14, 2013, 35 pages.
U.S. Appl. No. 13/943,604, filed Jul. 16, 2013, Ma et al.
Notice of Allowability and Examiner-Initiated Interview Summary for U.S. Appl. No. 11/524,048, dated Jul. 3, 2013, 11 pages.
One-month Office Action for U.S. Appl. No. 11/347,000, dated Jul. 26, 2013, 6 pages.
U.S. Appl. No. 13/830,497, filed Mar. 14, 2013, Humphries et al.
"About Reis, Products & Services," [online], Retrieved from the Internet via the Wayback Machine dated Feb. 5, 2002 on Jun. 13, 2013, URL: http://reis.com/about/aboutproducts_rentcomps.cfm, 2 pages.
"Trulia Estimates," [online], Retrieved from the Internet via the Wayback Machine dated Jan. 16, 2013, URL:http//www.trulia.com/trulia_estimates/, 2 pages.
Defendant Trulia, Inc.'s Answer to Complaint for Patent Infringement and Counterclaim, Demand for Jury Trial, Case No. 2:12-cv-01549-JLR, Mar. 1, 2013, 10 pages.
Defendant Trulia, Inc.'s Non-Infringement and Invalidity Contentions, Exhibit A, Case No. 2:12-cv-01549-JLR, Jun. 21, 2013, 267 pages.
First American Real Estate Solutions Releases ValuePoint4, AVM News, Thomson Media, vol. 1, Issue 10, Oct. 2002, pp. 28-29.
Preliminary Patent Owner Response for U.S. Pat. No. 7,970,674, Case No. CBM2013-00056, Dec. 18, 2013, 85 pages.
Reis SE 2.0 User Guide Book, Reis, 2004, 40 pages.
Reis Valuation and Credit Risk Analysis Module Overview, [online], Sep. 18, 2003, Retrieved from the Internet via the Wayback Machine dated Sep. 19, 2003 on Jun. 17, 2013, URL: http://www.reiscom/valuation/valuationOverview.cfm, 2 pages.
Valuations, Claims Cross Engines, Inman News Features, Dec. 10, 2002, 1 page.
"2002 Inman Innovator Award Nominees Announced," PR Newswire, Jul. 16, 2002, 3 pages.
"Banton Technologies Announces National Home Evaluation Coverage; Company's ValueWizard 3.0 Assesses All Regions of the United States," Business Wire, Jun. 10, 2003, [online] Retrieved from the Internet: URL: http://www.the free library.com/_/print/PrintArticle.aspx?id=102949279, 2 pages.
"Basis100 Partners to Offer Automated Valuation Service," Canada StockWatch, Jan. 27, 2004, 2 pages.
"Basis100 Partners with First American," PR Newswire, Jan. 27, 2004, 3 pages.
"Casa(TM) to Value More Than $100 Billion of Residential Real Estate in 2001—Leading Lenders Saving Big without Compromising Loan Quality," PR Newswire, May 21, 2001, 3 pages.
"Directory of Valuation Providers, Your Source for Valuation Information," Zackin Publications Inc., 2004, 5 pages.
"First American Expands Real Estate Valuation Line, Aims to Increase Accuracy with Addition of Veros, Basis100 AVMs," Inman News, Mar. 15, 2004, 2 pages.
"First American Real Estate Solutions Experiences Record," PR Newswire, Nov. 4, 2002, 3 pages.
"First American Real Estate Solutions Releases ValuePoint4," PR Newswire, Oct. 21, 2002, 3 pages.
"First American Real Estate Solutions' ValuePoint(R)4 Experiences Explosive Growth in 2004—Leading Automated Valuation Model (AVM) Usage Grows More Than 700 Percent in 12-Month Period," PR Newswire, Mar. 24, 2005, 3 pages.
"Franchise Offering Circular for Prospective Franchisees," U.S. Appraisal, Nov. 1, 1986, 87 pages.
"GMAC-RFC Selects First American Real Estate Solutions' ValuePoint(R)4 Automated Valuation Model (AVM)," PR Newswire, Jun. 28, 2004, 3 pages.
"HNC Software and RealQuest Team to Provide Widespread Automated Property Valuation; Areas Users to Have Online Access to Texas MLS," Business Wire, Oct. 1, 1997, 3 pages.
"HomeAdvisor Ranks First in Gomez Poll," Realty Times, Jun. 13, 2001, 3 pages.
"HomeAdvisor Spin-Off Aims to Service Realty Industry," Directions on Microsoft, Apr. 24, 2000, 2 pages.
"HomeSeekers.com and MSN HomeAdvisor Provide Free Web Pages for All Real Estate Agents," PR Newswire, May 20, 1999, 3 pages.
"How do we value your home?," [online] CSWOnline, Retrieved from the Internet via the Wayback Machine dated Oct. 23, 1999, URL: http://w w w .csw online.com/method.shtml, 1 page.
"In Brief: HomeAdvisor Secures $100 Million in Equity Funding," Directions on Microsoft, Aug. 28, 2000, 1 page.
"Microsoft Real Estate Venture Gets Large Investment," The New York Times, Technology section, Aug. 23, 2000, 2 pages.
"MSN HomeAdvisor Becomes Most-Visited Home and Real Estate Web Site, According to Media Metrix," Microsoft News Center,

(56) References Cited

OTHER PUBLICATIONS

Apr. 13, 2001, Retrieved from the Internet: URL: http://www.microsoft.com/enus/ news/press/2001/Apr01/04-13MarchTrafficPR.aspx?navV3Index=0, 2 pages.
"MSN HomeAdvisor Helps Real Estate Agents and Customers Feel Right at Home on the Internet," Microsoft News Center, Dec. 14, 1998, Retrieved from the Internet: URL: http://www.microsoft.com/enus/ news/features/1998/12-14msn.aspx?navV3Index=0, 2 pages.
"Nation's First Fully Interactive AVM Debuts in Las Vegas AVM News," PRweb press release, AVM News, Feb. 4, 2006, 1 page.
"NetNumina Solutions Creates Robust E-Business Solution for Leader in Real Estate Lending," PR Newswire, Aug. 16, 1999, 3 pages.
"Reis Inc.," Commercial Property News, vol. 18, Issue 6, Mar. 16, 2004, 2 pages.
"Reis, Inc. Launches Apartment Version of Online Valuation and Credit Risk Analysis Module," Business Wire, Nov. 7, 2002, 2 pages.
"RMBS: Guidelines for the Use of Automated Valuation Models for U.K. RMBS Transactions," Standard and Poors.com [online], Sep. 26, 2005 [retrieved Aug. 6, 2013], Retrieved from the Internet, S&P Archive: URL: www.standardandpoors.com/prot/ratings/articles/en/us/?articleType=HTML&assetID=1245330509010, 4 pages.
"Sample CASA Report," [online] CSWOnline, Retrieved from the Internet via the Wayback Machine dated Nov. 6, 1999, URL: http://w w w .csw online.com/sample.shtml, 3 pages.
"Standard on Automated Valuation Models (AVMs)", International Association of Assessing Officers, Approved Sep. 2003, 36 pages.
"The Appraisal" Report, U.S.Appraisal, dated at least by Sep. 29, 1983, 4 pages.
"The Appraisal" Report, U.S.Appraisal, not dated, 4 pages.
"The Appraiser," Certificate of Copyright Registration, Jun. 25, 1982, 4 pages.
"The Appraiser," Certificate of Copyright Registration, Oct. 19, 1981, 3 pages.
"The Assessor" Demo Video, U.S.Appraisal, [Accessed for review on Jun. 21, 2013, *Zillow Inc.* vs. *Trulia* Case No. 2:12-cv-01549-JLR], [Transcribed Oct. 8, 2013], 10 pages.
"The Assessor" Newsletter, US Appraisal, dated at least by Apr. 10, 1985, 4 pages.
"The Assessor" Source Code, U.S.Appraisal, [Accessed for review on Jun. 21, 2013, *Zillow Inc.* vs. *Trulia* Case No. 2:12-cv-01549-JLR], 2,460 pages.
"The Assessor," Certificate of Copyright Registration, Feb. 2, 1984, 2 pages.
"TransUnion Acquires Banton Technologies," PR Newswire, Oct. 20, 2003, 3 pages.
"TransUnion and CSW Form Partnership," Mortgage Banking, vol. 62, Issue 6, Mar. 31, 2002, 1 page.
"Uniform Standards of Professional Appraisal Practice and Advisory Opinions 2005 Edition<" Electronic USPAP 2005 Edition, Appraisal Standards Board, The Appraisal Foundation, Effective Jan. 1, 2005, 10 pages.
"USPAP Q&A," vol. 9, No. 6, The Appraisal Foundation, Jun. 2007, 2 pages.
"What Is an AVM?", Real-Info.com [online], Dec. 22, 2005 [retrieved on Aug. 6, 2013]. Retrieved from the Internet via Internet Archive Wayback Machine: URL: web.archive.org/web/20051222120807/http://www.real-info.com/products_avm.asp?RISID=e8fc23a9a1189fbff9b968e8f86ccde6], 3 pages.
Xactware Unveils Web-Based Valuation Tool for Underwriting, PR Newswire, Dec. 10, 2002, 3 pages.
"Xactware. (Central Utah)," Utah Business, vol. 17, Issue 3, Mar. 1, 2003, 1 page.
Assignment of Copyright to U.S.Appraisal by Flying Software, Inc., Jan. 2, 1982, 2 pages.
AVM News, Thomson Media, vol. 1, Issue 1 Jan. 2002, 23 pages.
AVM News, Thomson Media, vol. 1, Issue 10, Oct. 2002, 34 pages.
AVM News, Thomson Media, vol. 1, Issue 11, Nov. 2002, 28 pages.
AVM News, Thomson Media, vol. 1, Issue 12, Dec. 2002, 14 pages.
AVM News, Thomson Media, vol. 1, Issue 2, Feb. 2002, 13 pages.
AVM News, Thomson Media, vol. 1, Issue 3, Mar. 2002, 21 pages.
AVM News, Thomson Media, vol. 1, Issue 4, Apr. 2002, 24 pages.
AVM News, Thomson Media, vol. 1, Issue 5, May 2002, 35 pages.
AVM News, Thomson Media, vol. 1, Issue 6, Jun. 2002, 19 pages.
AVM News, Thomson Media, vol. 1, Issue 7, Jul. 2002, 24 pages.
AVM News, Thomson Media, vol. 1, Issue 8, Aug. 2002, 17 pages.
AVM News, Thomson Media, vol. 1, Issue 9, Sep. 2002, 15 pages.
AVM News, Thomson Media, vol. 10, Issue 11-12, Nov.-Dec. 2011, 70 pages.
AVM News, Thomson Media, vol. 10, Issue 1-2, Jan.-Feb. 2011, 72 pages.
AVM News, Thomson Media, vol. 10, Issue 3-4, Mar.-Apr. 2011, 100 pages.
AVM News, Thomson Media, vol. 10, Issue 5-6, May-Jun. 2011, 106 pages.
AVM News, Thomson Media, vol. 10, Issue 7-8, Jul.-Aug. 2011, 82 pages.
AVM News, Thomson Media, vol. 10, Issue 9-10, Sep.-Oct. 2011, 90 pages.
AVM News, Thomson Media, vol. 11, Issue 1-2, Jan.-Feb. 2012, 66 pages.
AVM News, Thomson Media, vol. 11, Issue 3-4, Mar.-Apr. 2012, 76 pages.
AVM News, Thomson Media, vol. 11, Issue 5-6, May-Jun. 2012, 72 pages.
AVM News, Thomson Media, vol. 2, Issue 1, Jan. 2003, 24 pages.
AVM News, Thomson Media, vol. 2, Issue 10, Oct. 2003, 31 pages.
AVM News, Thomson Media, vol. 2, Issue 11, Nov. 2003, 28 pages.
AVM News, Thomson Media, vol. 2, Issue 12, Dec. 2003, 18 pages.
AVM News, Thomson Media, vol. 2, Issue 2, Feb. 2003, 26 pages.
AVM News, Thomson Media, vol. 2, Issue 3, Mar. 2003, 29 pages.
AVM News, Thomson Media, vol. 2, Issue 4, Apr. 2003, 22 pages.
AVM News, Thomson Media, vol. 2, Issue 5, May 2003, 33 pages.
AVM News, Thomson Media, vol. 2, Issue 6, Jun. 2003, 38 pages.
AVM News, Thomson Media, vol. 2, Issue 7, Jul. 2003, 31 pages.
AVM News, Thomson Media, vol. 2, Issue 8, Aug. 2003, 24 pages.
AVM News, Thomson Media, vol. 2, Issue 9, Sep. 2003, 30 pages.
AVM News, Thomson Media, vol. 3, Issue 1, Jan. 2004, 24 pages.
AVM News, Thomson Media, vol. 3, Issue 10, Oct. 2004, 55 pages.
AVM News, Thomson Media, vol. 3, Issue 11, Nov. 2004, 54 pages.
AVM News, Thomson Media, vol. 3, Issue 12, Dec. 2004, 18 pages.
AVM News, Thomson Media, vol. 3, Issue 2, Feb. 2004, 26 pages.
AVM News, Thomson Media, vol. 3, Issue 3, Mar. 2004, 31 pages.
AVM News, Thomson Media, vol. 3, Issue 4, Apr. 2004, 36 pages.
AVM News, Thomson Media, vol. 3, Issue 5, May 2004, 37 pages.
AVM News, Thomson Media, vol. 3, Issue 6, Jun. 2004, 35 pages.
AVM News, Thomson Media, vol. 3, Issue 7, Jul. 2004, 49 pages.
AVM News, Thomson Media, vol. 3, Issue 8, Aug. 2004, 37 pages.
AVM News, Thomson Media, vol. 3, Issue 9, Sep. 2004, 31 pages.
AVM News, Thomson Media, vol. 4, Issue 1, Jan. 2005, 45 pages.
AVM News, Thomson Media, vol. 4, Issue 10, Oct. 2005, 51 pages.
AVM News, Thomson Media, vol. 4, Issue 11, Nov. 2005, 52 pages.
AVM News, Thomson Media, vol. 4, Issue 12, Dec. 2005, 56 pages.
AVM News, Thomson Media, vol. 4, Issue 2, Feb. 2005, 31 pages.
AVM News, Thomson Media, vol. 4, Issue 3, Mar. 2005, 39 pages.
AVM News, Thomson Media, vol. 4, Issue 4, Apr. 2005, 40 pages.
AVM News, Thomson Media, vol. 4, Issue 5, May 2005, 51 pages.
AVM News, Thomson Media, vol. 4, Issue 6, Jun. 2005, 34 pages.
AVM News, Thomson Media, vol. 4, Issue 7, Jul. 2005, 53 pages.
AVM News, Thomson Media, vol. 4, Issue 8, Aug. 2005, 30 pages.
AVM News, Thomson Media, vol. 4, Issue 9, Sep. 2005, 48 pages.
AVM News, Thomson Media, vol. 5, Issue 1, Jan. 2006, 58 pages.
AVM News, Thomson Media, vol. 5, Issue 10, Oct. 2006, 85 pages.
AVM News, Thomson Media, vol. 5, Issue 11, Nov. 2006, 86 pages.
AVM News, Thomson Media, vol. 5, Issue 12, Dec. 2006, 54 pages.
AVM News, Thomson Media, vol. 5, Issue 2, Feb. 2006, 53 pages.
AVM News, Thomson Media, vol. 5, Issue 3, Mar. 2006, 41 pages.
AVM News, Thomson Media, vol. 5, Issue 4, Apr. 2006, 54 pages.
AVM News, Thomson Media, vol. 5, Issue 5, May 2006, 48 pages.
AVM News, Thomson Media, vol. 5, Issue 6, Jun. 2006, 62 pages.
AVM News, Thomson Media, vol. 5, Issue 7, Jul. 2006, 74 pages.
AVM News, Thomson Media, vol. 5, Issue 8, Aug. 2006, 57 pages.

(56) References Cited

OTHER PUBLICATIONS

AVM News, Thomson Media, vol. 5, Issue 9, Sep. 2006, 63 pages.
AVM News, Thomson Media, vol. 6 Issue 3, Mar. 2007, 49 pages.
AVM News, Thomson Media, vol. 6, Issue 1, Jan. 2007, 42 pages.
AVM News, Thomson Media, vol. 6, Issue 10, Oct. 2007, 52 pages.
AVM News, Thomson Media, vol. 6, Issue 11, Nov. 2007, 23 pages.
AVM News, Thomson Media, vol. 6, Issue 2, Feb. 2007, 47 pages.
AVM News, Thomson Media, vol. 6, Issue 4, Apr. 2007, 59 pages.
AVM News, Thomson Media, vol. 6, Issue 5, May 2007, 66 pages.
AVM News, Thomson Media, vol. 6, Issue 6, Dec. 2007, 38 pages.
AVM News, Thomson Media, vol. 6, Issue 6, Jun. 2007, 46 pages.
AVM News, Thomson Media, vol. 6, Issue 8, Aug. 2007, 35 pages.
AVM News, Thomson Media, vol. 6, Issue 9, Sep. 2007, 37 pages.
AVM News, Thomson Media, vol. 6, Issue7, Jul. 2007, 51 pages.
AVM News, Thomson Media, vol. 7, Issue 07-08, Jul.-Aug. 2008, 56 pages.
AVM News, Thomson Media, vol. 7, Issue 1, Jan. 2008, 44 pages.
AVM News, Thomson Media, vol. 7, Issue 11-12, Nov.-Dec. 2008, 52 pages.
AVM News, Thomson Media, vol. 7, Issue 2, Feb. 2008, 35 pages.
AVM News, Thomson Media, vol. 7, Issue 3, Mar. 2008, 34 pages.
AVM News, Thomson Media, vol. 7, Issue 4, Apr. 2008, 33 pages.
AVM News, Thomson Media, vol. 7, Issue 4-5, May-Jun. 2008, 46 pages.
AVM News, Thomson Media, vol. 7, Issue 9-10, Sep.-Oct. 2008, 68 pages.
AVM News, Thomson Media, vol. 8, Issue 11-12, Nov.-Dec. 2009, 62 pages.
AVM News, Thomson Media, vol. 8, Issue 1-2, Jan.-Feb. 2009, 71 pages.
AVM News, Thomson Media, vol. 8, Issue 3-4, Mar.-Apr. 2009, 45 pages.
AVM News, Thomson Media, vol. 8, Issue 5-6, May-Jun. 2009, 65 pages.
AVM News, Thomson Media, vol. 8, Issue 7-8, Jul.-Aug. 2009, 71 pages.
AVM News, Thomson Media, vol. 8, Issue 9-10, Sep.-Oct. 2009, 53 pages.
AVM News, Thomson Media, vol. 9, Issue 11-12, Nov.-Dec. 2010, 75 pages.
AVM News, Thomson Media, vol. 9, Issue 1-2, Jan.-Feb. 2010, 66 pages.
AVM News, Thomson Media, vol. 9, Issue 3-4, Mar.-Apr. 2010, 63 pages.
AVM News, Thomson Media, vol. 9, Issue 5-6, May-Jun. 2010, 69 pages.
AVM News, Thomson Media, vol. 9, Issue 7-8, Jul.-Aug. 2010, 63 pages.
AVM News, Thomson Media, vol. 9, Issue 9-10, Sep.-Oct. 2010, 69 pages.
Basch, Mark, "Basis100 Sold to California Firm," The Florida Times Union, Jacksonville.com, Jul. 1, 2004, 2 pages.
Borst, Richard A. et al., "An Evaluation of Multiple Regression Analysis, Comparable Sales Analysis and Artificial Neural Networks for the Mass Appraisal of Residential Properties in Northern Ireland," 1996, 16 pages.
Borst, Richard A. et al., "Use of GIS to Establish and Update CAMA Neighborhoods in Northern Ireland," Available prior to Sep. 1997, 9 pages.
Borst, Richard A., "A Valuation and Value Updating of Geographically Diverse Commercial Properties Using Artificial Neural Networks," 1993, 2 pages.
Borst, Richard A., "Computer Assisted Mass Appraisal, A New Growth Industry in the United States," Accessed from International Association of Assessing Officers Research and Technical Services Department, Document 00994, Dated no later than Jun. 8, 1979, 28 pages.
Borst, Richard A., "The Common Thread in Market Data Systems," World Congress on Computer-Assisted Valuation, Aug. 1-6, 1982, 14 pages.
Calhoun, Charles A., "Property Valuation Methods and Data in the United States," Housing Finance International Journal 16.2, Dec. 2001, pp. 12-23.
Casa Property Valuation screen capture, dated at least by Jan. 24, 2005, 1 page.
Complaint for Patent Infringement, Demand for Jury Trial for U.S. Pat. No. 7,970,674, Case 2:12-cv-01549-JLR, Sep. 12, 2012, 8 pages.
Cozzi, Guy, Real Estate Appraising from A to Z, 4th Edition, Nemmar Real Estate Training, Jan. 1, 2002, 226 pages, Parts 1-2.
Crowston, Kevin, et al., "Real Estate War in Cyberspace: An Emerging Electronic Market?," Syracuse University Surface, School of Information Studies (iSchool), Jan. 1, 1999, 14 pages.
Curriculum Vitae of Steven R. Kursh, Ph.D., CSDP, CLP, Aug. 2013, 9 pages.
Cypress Software Introduces Avm Module for Mark IV Application; Module Provides Instant Home Appraisal for Loans Processed by the Loan-Decisioning Platform, Business Wire, Nov. 15, 2005, 2 pages.
Declaration Brooke A.M. Taylor in Support of Plaintiff Vasudevan Software, Inc.'s Motion for Sanctions Against Microstrategy, Case No. 3:11-06637-RS-PSG, Nov. 20, 2012, 3 pages.
Declaration of Dr. Richard Borst, Aug. 26, 2013, 43 pages.
Declaration of John Kilpatrick, Case No. IPR2013-00034, Jun. 14, 2013, 23 pages.
Declaration of Jordan Connors in Support of Plaintiff Vasudevan Software, Inc.'s Motion for Sanctions Against Microstraqtegy, Case No. 3:11-06637-RS-PSG, Nov. 20, 2012, 4 pages.
Declaration of Leslie V. Payne in Support of Plaintiff Vasudevan Software, Inc.'s Motion for Sanctions Against Microstrategy, Case No. 3:11-06637-RS-PSG, Nov. 20, 2012, 3 pages.
Declaration of Steven R. Kursh, Ph.D., CSDP, CLP, Sep. 11, 2013, 107 pages.
Defendant Trulia, Inc.'s Non-Infringement and Invalidity Contentions, Case No. 2:12-cv-01549-JLR, Jun. 21, 2013, 24 pages.
Department of the Treasury, Internal Revenue Service, "How to Depreciate Property," Publication 946, made available at www.irs.gov by dated at least 2004, 112 pages.
Deposition Transcription of John A. Kilpatrick, Ph.D., Aug. 8, 2013, 263 pages.
Evaluation Services, Inc. Steps to Analysis, not dated, 15 pages.
Evaluation Services, Inc. Warranty to Lender's Service, Inc., dated at least by Feb. 12, 1997, 144 pages.
Evans, Blanche, "Microsoft HomeAdvisor: Software Giant, Real Estate Portal," Realty Times, Mar. 30, 2000, 3 pages.
Evans, Blanche, The Hottest E-careers in Real Estate, Dearborn Financial Publishing Inc., 2000, 241 pages.
Fannie Mae Form 2055, Federal National Mortgage Association [online], Mar. 2005, Retrieved from the Internet: URL: https://www.fanniemae.com/content/guide_form/2055.pdf, 8 pages.
Fannie Mae Form 2075, Desktop Underwriter Property Inspection Report, Federal National Mortgage Association [online], not dated, Retrieved from the Internet: URL: https://www.fanniemae.com/content/guide_form/2075.pdf, 3 pages.
Feldman, David et al., "Mortgage Default: Classification Trees Analysis," The Pinhas Sapir Center for Development Tel-Aviv University, Discussion Paper No. Mar. 2003, Oct. 2003, 46 pages.
File History of U.S. Pat. No. 7,970,674, Dated Feb. 3, 2006-Apr. 2, 2013, 404 pages, Parts 1-4.
Final Office Action for U.S. Appl. No. 11/347,024, dated Feb. 3, 2011, 35 pages.
Finkelstein, Brad, "PlatinumData Improving Value of Its Information," Origination News and SourceMedia, Inc., vol. 15, Section: Special Report, Section:2, Nov. 1, 2005, 2 pages.
Fletcher, June, "High-Tech Is Coming for High-End House Sales," Wall Street Journal, Sep. 19, 1997, 1 page.
Fletcher, June, "On the Web: What's Your House Worth?," Wall Street Journal, Sep. 26, 1997, 1 page.
Fletcher, June, "Touring the Tangled Web of For-Sale-by-Owner Homes," The Wall Street Journal, Jun. 6, 1997, 1 page.
Freddie Mac Form 70, Uniform Residential Appraisal Report, Federal Home Loan Mortgage Corporation [online], Mar. 2005,

(56) References Cited

OTHER PUBLICATIONS

Retrieved from the Internet: URL: https://www.fanniemae.com/content/guide_form/1004.pdf, 8 pages.
Freddie Mac's Home Value Explorer screen capture, dated at least by Jul. 15, 2003, 1 page.
Hochgraf, Lisa, "Tools for Top Speed," Credit Union Management, vol. 26, Issue 8, Aug. 1, 2003, 4 pages.
HomeSearch Report, [online], Retrieved from the Internet via the Wayback Machine dated Dec. 10, 2005 on Jun. 19, 2013, URL: http://homesmartreports.com/samples/samplehomesearch.htm, 3 pages.
HomeSmart About, [online], Retrieved from the Internet via the Wayback Machine dated Dec. 10, 2005 http://homesmartreports.com/hs_about.htm, 2 pages.
HomeSmart Sellers, [online], Retrieved from the Internet via the Wayback Machine dated Dec. 10, 2005 on Jun. 19, 2013, URL: http://homesmartreports.com/hs_owners.htm, 1 page.
HomeSmart Terms of Use, [online], Retrieved from the Internet via the Wayback Machine dated Dec. 10, 2005 on Jun. 19, 2013, URL: http://homesmartreports.com/hs_disclaimer.htm, 3 pages.
HomeSmartReports, [online], Retrieved from the Internet via the Wayback Machine dated Oct. 13, 2005 on Jun. 19, 2013, URL: http://homesmartreports.com/, 2 pages.
HomeSmartReports, [online], Retrieved from the Internet via the Wayback Machine dated Dec. 10, 2005 on Jun. 19, 2013, URL: http://homesmartreports.com/default.aspx, 1 page.
Infinite Regression, Certificate of Copyright Registration Filing, Apr. 2, 1984, 3 pages.
Jensen, David L., "Alternative Modeling Techniques in Computer-Assisted Mass Appraisal," Property Tax Journal, vol. 6, No. 3, Sep. 1987, pp. 193-237.
Kilpatrick, John A., "The Future of Real Estate Information," Real Estate Issues, Spring 2001, 8 pages.
Kilpatrick, John A., et al., "House Price Impacts of School District Choice," South Carolina Center for Applied Real Estate Education and Research, Dec. 28, 1998, 25 pages.
Krasilovsky, Peter, "Chris Terrill Discusses ServiceMagic's Rebranding to 'Home Advisor,'" Home Advisor, Oct. 17, 2012, 5 pages.
Lankarge, Vicki, et al., How to Increase the Value of Your Home: Simple, Budget-Conscious Techniques and Ideas That Will Make Your Home Worth Up to $100,000 More!, McGraw-Hill, 2004, 176 pages.
McCluskey, William J. et al., "An Evaluation of MRA, Comparable Sales Analysis, and ANNs for the Mass Apraisal of Residential Properties in Northern Ireland," Assessment Journal, Jan./Feb. 1997, 8 pages.
McGarity, M., "The Values Debate," Mortgage Banking, vol. 65, Issue 6, Mar. 1, 2005, 14 pages.
McWilliams, Charlyne H., "The Tale of AVMs," Mortgage Banking, vol. 64, Issue 5, Feb. 1, 2004, 7 pages.
Microstrategy Inc.'s Opposition to Plaintiff Vasudevan Software, Inc.'s Motion for Sanctions, Case No. 11-CV-06637-RS-PSG, Jan. 4, 2013, 23 pages.
Morton, T. Gregory, Regression Analysis Appraisal Models: Selected Topics and Issues, Center for Real Estate and Urban Economic Studies, University of Connecticut, Real Estate Report: No. 19, Oct. 1976, 85 pages.
MSN House & Home—More Useful Everyday screen capture, [online], Retrieved from the Internet via the Wayback Machine dated Mar. 23, 2003 on Jun. 19, 2013, URL: http://web.archive.org/web/20030323183505/http://houseandhome.msn.com/, 2 pages.
Mullaney, Timothy J., "A new Home Site on the Block," Bloomberg Businessweek [online], Feb. 7, 2006, Retrieved from the Internet: URL: http://www.businessweek.com/stories/2006-02-07/a-new-home-site-on-the-block, 3 pages.
Munarriz, Rick A., "Pop Goes the Bubble," The Motley Fool, Fool.com [online] Feb. 14, 2006, Retrieved from the Internet; URL: http://www.fool.com/investing/small-cap/2006/02/14/pop-goes-the-bubble.aspx, 4 pages.

O'Brien, Jeffrey M., "What's Your House Really Worth?," Fortune [online], Feb. 15, 2007, Retrieved from the Internet: URL: http://money.cnn.com/magazines/fortune/fortune_archive/2007/02/19/8400262/index.htm, 6 pages.
Oldham, Jennifer, "Pricing's Tangled Web, Consumers Using the Internet to Calculate Home Values Find that the Results—and Data They're Based on- Vary," Los Angeles Times, Jul. 30, 2000, 5 pages.
Pagourtzi, E. et al., "Real Estate Appraisal: A Review of Valuation Methods," Journal of Property Investment & Finance, vol. 21, No. 4, 2003, pp. 383-401.
PASS screen capture, dated at least by Oct. 20, 2004, 1 page.
Patent Owner's Observations on Cross Examination of Dr. Richard A. Borst, Ph. D., Case No. 3:11-06637-RS-PSG, Oct. 10, 2013, 9 pages.
Petition for Covered Business Method Patent Review for U.S. Pat. No. 7,970,674, CBM2013-00056, Sep. 11, 2013, 87 pages.
Petitioner's Reply to Patent Owner Response to Petition, U.S. Pat. No. 7,970,674, Case No. IPR2013-00034, Aug. 26, 2013, 20 pages.
Plaintiff Vasudevan Software, Inc.'s Notice of Motion and Motion for Sanctions Against Microstrategy, Case No. 3:11-06637-RS-PSG, Dec. 12, 2012, 23 pages.
Plaintiff Vasudevan Software, Inc.'s Reply in Support of Motion for Sanctions Against Microstrategy, Case No. 3:11-06637-RS-PSG, Jan. 14, 2013, 25 pages.
Potharst, R. et al., "Classification Trees for Problems with Monotonicity Constraints," ACM SIGKDD Explorations Newsletter 4.1, 2002, pp. 1-10.
Potharst, R. et al., "Classification Trees for Problems with Monotonicity Constraints," ERIM Report Series Research in Management, Erasmus Research Institute of Mangement, Apr. 2002, 39 pages.
PowerBase 6.0 screen capture, dated at least by Oct. 20, 2004, 1 page.
RealQuest.com screen capture, dated at least by Dec. 12, 2002, 1 page.
RealQuest.com screen capture, dated at least by Oct. 20, 2004, 1 page.
RealQuest.com Vector screen capture, dated at least by Oct. 20, 2004, 1 page.
RealQuest.com ValuePoint R4 Report screen capture, dated at least by Sep. 30, 2002, 1 page.
Reis SE 2.0 User Guide Book, Reis, 2005, 37 pages.
Response to Final Office Action for U.S. Appl. No. 11/347/024, Mar. 4, 2011, 17 pages.
Rossini, Peter, "Using Expert Systems and Artificial Intelligence for Real Estate Forecasting," Sixth Annual Pacific-Rim Real Estate Society Conference, Sydney, Australia, Jan. 24-27, 2000, 10 pages.
Rye, Owen E., "A Multiple Criteria Analysis Model for Real Estate Evaluation," Journal of Global Optimization 12.2, Mar. 1998, pp. 197-214.
Rye, Owen E., "Automated Property Assessment," Transactions of the American Association of Cost Engineers, Nov. 2004, pp. 28-32.
Sample Appraisal Report of a Single-Family Residence, U.S. Appraisal, Sep. 15, 1982, 16 pages.
Sample HomeSmart Value Report, [online], Retrieved from the Internet via the Wayback Machine dated Dec. 10, 2005 on Jun. 19, 2013, URL: http://homesmartreports.com/samples/samplevaluation.htm, 4 pages.
Sample Residential Appraisal Report, U.S.Appraisal, Jul. 16, 1982, 2 pages.
Simons, R. A., "Chapter 6: Valuation of Impaired Property," When Bad Things Happen to Good Property, Throupe, R. et al., Environmental Law Institute, May 2006, 30 pages.
Software Referral Agreement with Sole Source Provision between Sperry Corporation and U.S.Appraisal, May 1985, 47 pages.
System Operations Manual for "The Research Assistant", Evaluation Services, Inc., Feb. 12, 1997, 92 pages.
System Operations Manual, "The Research Assistant", Database Valuation Version, Evaluation Services, Inc., Feb. 12, 1997, 35 pages.
The Appraisal, An Automated Computerized Appraisal System, U.S.Appraisal, not dated, 4 pages.
The Appraiser, An Automatic Computerized Appraisal System, U.S.Appraisal, not dated, 4 pages.

(56) References Cited

OTHER PUBLICATIONS

The Assessor, A Computerized Assessment System, NCR Corporation, 1986, 6 pages.
The MicroAppraisal, Certificate of Copyright Registration, Feb. 2, 1984, 2 pages.
Transcript of Deposition of R. A. Borst, Ph. D., Case IPR2013-00034 (JL), Transcribed Sep. 19, 2013, 177 pages.
Transcript of Proceedings in Case No. C 11-06637 RS, Jan. 24, 2013, 24 pages.
U.S.Appraisal Business Plan, dated at least since Aug. 1, 1985, 30 pages.
U.S.Appraisal Offering Memorandum, Sep. 12, 1984, 66 pages.
US. Appraisal Profit and Loss Proforma, dated at least since Aug. 1, 1985, 38 pages.
Valuation Reports, Schedule A, U.S. Appraisal, dated at least by Nov. 1, 1986, 6 pages.
ValueWizard screen capture, not dated, 1 page.
VeroValue screen capture, dated at least by Sep. 30, 2004, 1 page.
Visual PAMSPro 2000, [online], Retrieved from the Internet via the Wayback Machine dated Mar. 4, 2001 on Jun. 19, 2013, URL: http://www.visualpamspro.com/prod01.htm, 2 pages.
Visual PAMSPro Custom Add Ins, [online], Retrieved from the Internet via the Wayback Machine dated Mar. 5, 2001 on Jun. 19, 2013, URL: http://www.visualpamspro.com/serv04.htm, 2 pages.
Visual PAMSPro Downloads, [online], Retrieved from the Internet via the Wayback Machine dated Mar. 2, 2001 on Jun. 19, 2013, URL: http://www.visualpamspro.com/download.htm, 1 page.
Visual PAMSPro Home, [online], Retrieved from the Internet via the Wayback Machine dated Mar. 2, 2001 on Jun. 19, 2013, URL: http://www.visualpamspro.com/, 1 page.
Visual PAMSPro News, [online], Retrieved from the Internet via the Wayback Machine dated Mar. 2, 2001 on Jun. 19, 2013, URL: http://www.visualpamspro.com/news.htm, 2 pages.
Visual PAMSPro Products, [online], Retrieved from the Internet via the Wayback Machine dated Mar. 2, 2001 on Jun. 19, 2013, URL: http://www.visualpamspro.com/products.htm, 1 page.
Visual PAMSPro Real Estate Appraisal Software, Appraisal Software Real Estate, [online], Retrieved from the Internet via the Wayback Machine dated Sep. 2, 2001 on Jun. 19, 2013, URL: http://www.visualpamspro.com/prodvpp2.htm, 6 pages.
Visual PAMSPro Tips and Tricks, [online], Retrieved from the Internet via the Wayback Machine dated Mar. 2, 2001 on Jun. 19, 2013, URL: http://www.visualpamspro.com/Tips-Tricks.htm, 1 page.
U.S. Appl. No. 14/041,450, filed Sep. 30, 2013, Humphries et al.
Non-Final Office Action for U.S. Appl. No. 11/524,047, dated Nov. 4, 2013, 8 pages.
Notice of Allowance for U.S. Appl. No. 11/347,000, dated Oct. 24, 2013, 12 pages.
Petitioner Response to Patent Owner's Observations on Cross Examination of Dr. Richard A. Borst, Ph.D., U.S. Pat. No. 7,970,674, Case IPR2013-00034, Oct. 24, 2013, 7 pages.
Oral Hearing Petitioner Demonstratives, U.S. Pat. No. 7,970,674, Case IPR2013-00034, File Date Nov. 19, 2013, 85 pages.
Replacement Oral Hearing Petitioner Demonstratives, U.S. Pat. No. 7,970,674, Case IPR2013-00034, Exhibit 2023, Oral Hearing Date Nov. 21, 2013, 83 pages.
Patent Owner's Demonstrative Exhibit for Oral Hearing, U.S. Pat. No. 7,970,674, Case IPR2013-00034, Exhibit 2023, File Date Nov. 19, 2013, 56 pages.
Replacement Patent Owner's Demonstrative Exhibit for Oral Hearing, U.S. Pat. No. 7,970,674, Case IPR2013-00034, File Date Nov. 21, 2013, 36 pages.
U.S. Appl. No. 14/167,962, filed Jan. 29, 2014, Humphries et al.
Dempster, A. P. et al., "Maximum Likelihood from Incomplete Data via the Algorithm," Journal of the Royal Statistical Society, 1977, Series B 39 (1): 1-38, JSTOR 2984875, MR 0501537, [online], retrieved from the Internet: URL: http://www.jstor.org/stable/2984875?origin=JSTOR-pdf, 38 pages.
Non-Final Office Action for U.S. Appl. No. 13/417,804, dated Feb. 26, 2014, 13 pages.

Oral Hearing Transcript for U.S. Pat. No. 7,970,674, Case No. IPR2013-00034, Held Nov. 21, 2013, Entered Feb. 20, 2014, 96 pages.
Wikipedia, Expectation-maximization Algorithm, [online] Retrieved from the Internet via the Wayback Machine dated Dec. 21, 2013 on Feb. 28, 2014, URL: http://en.wikipedia.org/wiki/Expectation%E2%80%93maximization_algorithm, 13 pages.
Decision—Institution of Covered Business Method Patent Review for U.S. Pat. No. 7,970,674, Case CBM2013-00056, Entered Mar. 10, 2014, 36 pages.
Final Written Decision for U.S. Pat. No. 7,970,674, Case IPR2013-00034, Entered Mar. 27, 2014, 44 pages.
U.S. Appl. No. 14/191,388, filed Feb. 26, 2014, Ma et al.
Declaration of Steven R. Kursh, Ph.D., CSDP, CLP, CBM2014-00115, Filed Apr. 10, 2014, 108 pages.
Petition for Covered Business Method Patent Review for U.S. Pat. No. 7,970,674, CBM2014-00115, Apr. 10, 2014, 69 pages.
Great Britain Search Report for GB0701944.1, dated Mar. 28, 2007, 3 pages.
Notice of Allowance for U.S. Appl. No. 11/524,048, dated Jul. 18, 2013, 10 pages.
ValuePoint4 Report; File No. 04040103629, Apr. 12, 2004, 3 pages.
U.S. Appl. No. 14/318,536, filed Jun. 27, 2014, Cheng et al.
U.S. Appl. No. 14/325,094, filed Jul. 7, 2014, Bruce et al.
Non-Final Office Action for U.S. Appl. No. 14/191,388, dated Aug. 7, 2014, 5 pages.
Non-Final Office Action for U.S. Appl. No. 14/318,536, dated Aug. 8, 2014, 38 pages.
Notice of Allowance for U.S. Appl. No. 14/191,388, dated Jun. 25, 2014, 9 pages.
Notice of Appeal for U.S. Pat. No. 7,970,674, Case IPR2013-00034, May 1, 2014, 5 pages.
Patent Owner's Response to the Petition for Covered Business Method Patent Review for U.S. Pat. No. 7,970,674, Case No. CBM2013-00056, Jun. 20, 2014, 72 pages.
Requirement Under Rule 105 for U.S. Appl. No. 11/927,623, dated Jul. 2, 2014, 4 pages.
Final Office Action for U.S. Appl. No. 13/417,804, dated Aug. 13, 2014, 14 pages.
U.S. Appl. No. 14/524,148, filed Oct. 27, 2014, Humphries et al.
Final Office Action for U.S. Appl. No. 14/191,388, dated Dec. 15, 2014, 12 pages.
Final Office Action for U.S. Appl. No. 14/318,536, dated Dec. 11, 2014, 47 pages.
Non-Final Office Action for U.S. Appl. No. 11/254,047, dated Dec. 1, 2014, 26 pages.
Non-Final Office Action for U.S. Appl. No. 13/044,490, dated Dec. 17, 2014, 30 pages.
Non-Final Office Action for U.S. Appl. No. 13/417,804, dated Jan. 28, 2015, 12 pages.
Non-Final Office Action for U.S. Appl. No. 13/943,604, dated Nov. 19, 2014, 24 pages.
Non-Final Office Action for U.S. Appl. No. 14/167,962, dated Oct. 31, 2014, 23 pages.
Palmquist, Raymond B., "Alternative Techniques for Developing Real Estate Price Indexes," The Review of Economics and Statistics, vol. 62, No. 3 (Aug. 1980), pp. 442-448.
Redfin, https://web.archive.org/web/20060907212454/http ://www.redfin.com/stingray/do/terms-ofuse?rt=fn-tl, Wayback Machine Sep. 7, 2006.
U.S. Appl. No. 12/924,037, filed Sep. 16, 2010, Flint et al.
U.S. Appl. No. 13/843,577, filed Mar. 15, 2013, Humphries et al.
U.S. Appl. No. 14/078,076, filed Nov. 12, 2013, Daimler et al.
U.S. Appl. No. 14/640,860, filed Mar. 6, 2015, Rao et al.
U.S. Appl. No. 14/704,567, filed May 5, 2015, Wang et al.
U.S. Appl. No. 14/709,719, filed May 12, 2015, Humphries et al.
U.S. Appl. No. 14/721,437, filed May 26, 2015, Humphries et al.
U.S. Appl. No. 14/846,632, filed Sep. 4, 2015, Ma et al.
Australian Examiners First Report in Australian Patent Application 2007216858, dated Dec. 22, 2008, 2 pages.
CDR Business Solutions, LLC, What is Relar, <http://www.relar.com/relarsystem.aspx> Aug. 24, 2011, Archived by Internet Wayback

(56) References Cited

OTHER PUBLICATIONS

Machine <http://web.archive.org/web/20110824084613/http://www.relar.com/relarsystem.aspx> viewed Aug. 20, 2015, pp. 1-4.
David Leonhardt, The Internet Knows What You'll Do Next, Jul. 5, 2006, http://www.nytimes.com/2006/07/05/business/05leonhardt.html?ex=1309752000&en=8be0be92819a6f8f&ei=5088&partner=rssnyt&emc=rss.
European Examination Report, Application No. 07018380.1, dated Oct. 24, 2008, 6 pages.
Final Office Action for U.S. Appl. No. 11/524,047, dated Jun. 12, 2015, 31 pages.
Final Office Action for U.S. Appl. No. 13/044,490, dated May 7, 2015, 36 pages.
Final Office Action for U.S. Appl. No. 13/943,604, dated Mar. 6, 2015, 28 pages.
Final Office Action for U.S. Appl. No. 14/167,962, dated Sep. 30, 2015, 13 pages.
Final Office Action for U.S. Appl. No. 12/924,037, dated May 16, 2013, 11 pages.
Final Office Action for U.S. Appl. No. 12/924,037, dated Jun. 16, 2015, 19 pages.
Google, Google Trends, retrieved from the internet Oct. 12, 2015 <http://www.google.com/trends> (website address only—No document).
Great Britain Examination Report in Application No. GB0701944.1, dated May 5, 2010, 3 pages.
Indeed, Job Trends: Podcast, retrieved from the internet Oct. 12, 2015 <http://www.indeed.com/jobtrends> (website only—No document).
Jobster, Job Search Trends for Keywords and Locations, retrieved from the internet Oct. 12, 2015 <http://www.jobster.com/find/US/jon/search/trends> (website only—No document).
John Battelle's Searchblog,: The Database of Intentions, Nov. 13, 2003.
Miller et al., A Note on Leading Indicators of Housing Market Price Trends, vol. 1, No. 1, 1986.
Miller et al., Multiple Regression Condominium Valuation with a Touch of Behavioral Theory, The Appraisal Journal 1987.
Miller et al., Pricing Strategies and Residential Property Selling Prices, The Journal of Real Estate Research, vol. 2, No. 1, Nov. 1, 1987.
Miller et al., The Impact of Interest Rates and Employment on Nominal Housing Prices, International Real Estate Review, vol. 8 No. 1, pp. 26-42, 2005.
Non-Final Office Action for U.S. Appl. No. 13/843,577, dated Sep. 24, 2015, 50 pages.
Non-Final Office Action for U.S. Appl. No. 14/167,962, dated Mar. 3, 2015, 26 pages.
Non-Final Office Action for U.S. Appl. No. 12/924,037, dated Nov. 17, 2014, 13 pages.
Non-Final Office Action for U.S. Appl. No. 12/924,037, dated Jan. 10, 2013, 9 pages.
Non-Final Office Action for U.S. Appl. No. 12/924,037, dated May 27, 2014, 14 pages.
Non-Final Office Action for U.S. Appl. No. 14/078,076, dated Aug. 14, 2015, 15 pages.
Preliminary Patent Owner Response for U.S. Pat. No. 7,970,674, Case No. IPR2013-00034, Feb. 15, 2013, 39 pages.
Real Info Inc., RELAR Sample Report, <http://www.real-info.com/products_RELAR.asp> Aug. 18, 2010, Archived by Internet Wayback Machine <http://web.archive.org/web/20100818012252/http://www.real-info.com/products_RELAR.asp> viewed Aug. 24, 2015, pp. 14.
Second Office Action in Chinese Patent Application No. 200710306194.8, dated Apr. 1, 2010, 9 pages, English translation.
Wikipedia, Survival Analysis, <http://en.wikipedia.org/wiki/Survival_analysis> Oct. 16, 2011, Archived by Internet Wayback Machine <http://web.archive.org/web/20111016061152/http://!en.wikipedia.org/wiki/Survival_analysis>, viewed Aug. 28, 2015, pp. 1-5.
Zillow.com, Quarterly Report 2Q 2006, A Review of the San Francisco Real Estate Market.
FHFA, "Distress-Free House Price Indexes." https://www.fhfa.gov/DataTools/Downloads/Documents/HPI_Focus_Pieces/2012Q2_HPI_N508.pdf. Jul. 13, 2014.
Final Office Action for U.S. Appl. No. 13/417,804, dated Oct. 14, 2015, 11 pages.
Final Office Action for U.S. Appl. No. 13/828,680, dated Jul. 26, 2016, 59 pages.
Final Office Action for U.S. Appl. No. 13/843,577, dated Mar. 22, 2016, 63 pages.
Final Office Action for U.S. Appl. No. 14/078,076, dated Feb. 26, 2016, 21 pages.
Final Office Action for U.S. Appl. No. 11/927,623, dated Nov. 3, 2016, 15 pages.
MRMLS Realist Tax System Foreclosure User Guide, crmls.org/help/realist_manuals/realist_foreclosure.pdf. Oct. 30, 2007.
Non-Final Office Action for U.S. Appl. No. 11/927,623, dated Jan. 11, 2016, 13 pages.
Non-Final Office Action for U.S. Appl. No. 13/044,490, dated Jan. 14, 2016, 18 pages.
Non-Final Office Action for U.S. Appl. No. 13/828,680, dated Dec. 15, 2015, 42 pages.
Non-Final Office Action for U.S. Appl. No. 13/830,497, dated Sep. 14, 2016, 52 pages.
Non-Final Office Action for U.S. Appl. No. 14/078,076, dated Oct. 19, 2016, 29 pages.
Non-Final Office Action for U.S. Appl. No. 13/044,490, dated Jul. 22, 2016, 11 pages.
Non-Final Office Action for U.S. Appl. No. 14/041,450, dated Aug. 18, 2016, 48 pages.
Non-Final Office Action for U.S. Appl. No. 12/924,037, dated Nov. 10, 2016, 19 pages.
Notice of Allowance for U.S. Appl. No. 13/417,804, dated Aug. 18, 2016, 15 pages.
Beracha, E., et al., "The Rent versus Buy Decision: Investigating the Needed Property Appreciation Rates to be Indifferent between Renting and Buying Property." Journal of Real Estate Practice and Education, 15(2), 71-88.
Non-Final Office Action for U.S. Appl. No. 12/924,037, dated Jan. 10, 2018, 17 pages.
Non-Final Office Action for U.S. Appl. No. 13/044,490, dated Jan. 24, 2018, 8 pages.
Non-Final Office Action for U.S. Appl. No. 14/524,148, dated Dec. 15, 2017, 27 pages.
Non-Final Office Action for U.S. Appl. No. 14/721,437, dated Dec. 18, 2017, 53 pages.
Non-Final Office Action for U.S. Appl. No. 14/846,632, dated Jan. 16, 2018, 9 pages.
Non-Final Office Action for U.S. Appl. No. 14/709,719, dated Jan. 31, 2018, 11 pages.
U.S. Appl. No. 12/924,037 of Flint et al., filed Sep. 16, 2010.
U.S. Appl. No. 15/439,388 of Bruce et al., filed Feb. 22, 2017.
U.S. Appl. No. 15/456,235 of VanderMey, filed Mar. 10, 2017.
U.S. Appl. No. 15/698,276 of Humphries, filed Sep. 7, 2017.
U.S. Appl. No. 15/715,098 of Moghimi, filed Sep. 25, 2017.
U.S. Appl. No. 15/789,617 of VanderMey, filed Oct. 20, 2017.
Final Office Action for U.S. Appl. No. 12/924,037, dated Jul. 19, 2017, 25 pages.
Final Office Action for U.S. Appl. No. 14/078,076, dated Jul. 27, 2017, 32 pages.
Final Office Action for U.S. Appl. No. 14/167,962, dated Nov. 9, 2017, 23 pages.
Final Office Action for U.S. Appl. No. 13/044,490, dated Mar. 29, 2017, 7 pages.
Final Office Action for U.S. Appl. No. 13/830,497, dated Jun. 8, 2017, 57 pages.
Final Office Action for U.S. Appl. No. 13/843,577, dated Oct. 6, 2017, 83 pages.
Final Office Action for U.S. Appl. No. 14/041,450, dated Apr. 6, 2017, 47 pages.
Non-Final Office Action for U.S. Appl. No. 14/041,450, dated Nov. 16, 2017, 11 pages.

(56) References Cited

OTHER PUBLICATIONS

Non-Final Office Action for U.S. Appl. No. 14/704,567, dated Dec. 7, 2017, 19 pages.
Non-Final Office Action for U.S. Appl. No. 13/828,680, dated Nov. 16, 2017, 47 pages.
Non-Final Office Action for U.S. Appl. No. 13/843,577, dated Dec. 19, 2016, 80 pages.
Non-Final Office Action for U.S. Appl. No. 14/325,094, dated Oct. 31, 2017, 69 pages.
Non-Final Office Action for U.S. Appl. No. 11/927,623, dated Oct. 6, 2017, 15 pages.
Non-Final Office Action for U.S. Appl. No. 14/167,962, dated Apr. 6, 2017, 22 pages.
Final Office Action for U.S. Appl. No. 14/709,719, dated Aug. 3, 2018, 27 pages.
Non-Final Office Action for U.S. Appl. No. 13/843,577, dated Aug. 30, 2018, 63 pages.
Final Office Action for U.S. Appl. No. 14/640,860, dated Oct. 23, 2018, 85 pages.
U.S. Appl. No. 16/125,318 for Humphries, filed Sep. 7, 2018.
U.S. Appl. No. 16/129,282 for Humphries, filed Sep. 12, 2018.
U.S. Appl. No. 15/996,787 of VanderMey, filed Jun. 4, 2018.
Archer, W.R. et al., "Measuring the Importance of Location in House Price Appreciation", J. of Urban Economics, vol. 40, 1996, pp. 334-353, accessible at https://www.sciencedirect.com/science/article/pii/S0094119096900364 (accessed Feb. 26, 2018). (Year: 1996).
Campbell, "Forced Sales and House Prices", 101 American Economic Review 2108, pp. 2108-2131, Aug. 2011.
Clauretie, "Estimating the House Foreclosure Discount Corrected for Spatial Price Interdependence and Endogeneity of Marketing Time", 37 Real Estate Economics 43, pp. 44-48, 2009.
Final Office Action for U.S. Appl. No. 14/041,450, dated Jun. 29, 2018, 14 pages.
Final Office Action for U.S. Appl. No. 14/704,567, dated May 1, 2018, 24 pages.
Final Office Action for U.S. Appl. No. 12/924,037, dated Jun. 7, 2018, 19 pages.
Final Office Action for U.S. Appl. No. 14/325,094, dated Jun. 5, 2018, 81 pages.
Final Office Action for U.S. Appl. No. 14/524,148, dated Jul. 19, 2018, 54 pages.
Final Office Action for U.S. Appl. No. 13/828,680, dated Jul. 11, 2018, 59 pages.
Final Office Action for U.S. Appl. No. 14/846,632, dated Jun. 11, 2018, 16 pages.
Gelfand, A.E. et al., "The Dynamics of Location in Home Price," J. of Real Estate Fin. and Econ., vol. 29:2, 2004, pp. 149-166, accessible at https://link.springer.com/content/pdf/10.1023%2FB%3AREAL.0000035308.15346,0a.pdf (accessed Feb. 26, 2018). (Year: 2004).
Humphries, S., "Foreclosure Liquidations Abate in the Fourth Quarter But at the Expense of Numbers of Homes Underwater," Zillow Research, Feb. 8, 2011, 3 pages.
Non-Final Office Action for U.S. Appl. No. 11/927,623, dated Mar. 26, 2018, 15 pages.
Non-Final Office Action for U.S. Appl. No. 14/640,860, dated Mar. 7, 2018, 141 pages.
Non-Final Office Action for U.S. Appl. No. 13/830,497, dated Apr. 12, 2018, 48 pages.
Notice of Allowance for U.S. Appl. No. 13/044,490, dated May 22, 2018, 8 pages.
Notice of Allowance for U.S. Appl. No. 14/167,962, dated Apr. 9, 2018, 11 pages.
Notice of Allowance for U.S. Appl. No. 14/167,962, dated May 14, 2018, 8 pages.
Quercia, R.G. et al., "Spatio-Temporal Measurement of House Price Appreciation in Underserved Areas." J. of Housing Research, vol. 11, 2000, available at https://pdfs.semanticscholar.org/3a44/ddfbc508f61f8952d7e440c37cfdfat441 ba.pdf (accessed Feb. 26, 2018). (Year: 2000).
Roth, JD, "Is it Setter to Rent or to Buy?" Time Business, Dec. 3, 2012, 2 pages.
Final Office Actien for U.S. Appl. No. 14/721,437, dated Nov. 9, 2018, 84 pages.
Non-Final Office Action for U.S. Appl. No. 12/924,037, dated Nov. 7, 2018, 10 pages.
Notice of Allowance for U.S. Appl. No. 13/044,490, dated Dec. 5, 2018, 6 pages.
Readyratios.com, "Cost Approach to Value," https://www.readyratios.com/reference/appraisal/cost_approach_to_value.html, archived on Jul. 16, 2013, https://web.archive.org/web/20130716153950/https:www.readyratios.com/reference/appraisal/cost_approach_to_value.html, viewed Oct. 30, 2018, p. 1.
U.S. Appl. No. 16/235,009 for Humphries, filed Dec. 28, 2018.
Non-Final Office Action for U.S. Appl. No. 14/325,094, dated Dec. 18, 2018, 95 pages.
Non-Final Office Action for U.S. Appl. No. 14/846,632, dated Dec. 26, 2018, 13 pages.
Non-Final Office Action for U.S. Appl. No. 14/041,450, dated Jan. 8, 2019, 23 pages.
Non-Final Office Action for U.S. Appl. No. 14/704,567, dated Apr. 1, 2019, 29 pages.
U.S. Appl. No. 16/423,873 for Humphries, filed May 28, 2019.
Final Office Action for U.S. Appl. No. 14/325,094, dated Jun. 7, 2019, 58 pages.
Final Office Action for U.S. Appl. No. 11/927,623, dated Jun. 14, 2019, 18 pages.
Non-Final Office Action for U.S. Appl. No. 14/709,719, dated Jun. 3, 2019, 29 pages.
Notice of Allowance for U.S. Appl. No. 12/924,037, dated Apr. 24, 2019, 11 pages.

* cited by examiner

Henderson County listing table — 400

| id | address | sq. ft. | bedrooms | bathrooms | floors | view | year | Cat Allowed | Electricity included | listing price | date |
|---|---|---|---|---|---|---|---|---|---|---|---|
| 1 | 111 Main St., Hendricks, IL 62012 | 1850 | 4 | 2 | 2 | no | 1953 | no | yes | $1,325 | 1/3/2005 |
| 2 | 96 Elm St., Hendricks, IL 62014 | 2220 | 6 | 2 | 3 | no | 1965 | yes | no | $2,010 | 1/8/2005 |
| 3 | 140 Cottontail Rd., Baron, IL 62019 | 1375 | 3 | 1 | 1 | no | 1974 | yes | yes | $987 | 1/11/2005 |
| 4 | 6 Spratt Ln., Baron, IL 62019 | 1590 | 2 | 2 | 1 | no | 1973 | no | yes | $1,065 | 1/14/2005 |
| 5 | 776 Fir St., Hendricks, IL 62014 | 2280 | 3 | 3 | 2 | yes | 1948 | no | yes | $2,510 | 1/26/2005 |
| 6 | 111 Industry Ave., Fenton IL 62017 | 1950 | 2 | 2 | 1 | no | 1925 | no | no | $2,400 | 2/4/2005 |
| 7 | 105 Elm St., Hendricks, IL 62014 | 2180 | 5 | 2 | 3 | yes | 1940 | yes | yes | $2,300 | 2/4/2005 |
| 8 | 110 Muffet St., Baron, IL 62014 | 1675 | 4 | 2 | 1 | no | 1975 | no | yes | $749 | 2/14/2005 |
| 9 | 156 Elm St., Hendricks, IL 62014 | 2400 | 6 | 3 | 2 | yes | 1938 | yes | yes | $2,535 | 2/15/2005 |
| 10 | 142 Cottontail Rd., Baron, IL 62019 | 1450 | 3 | 1 | 1 | no | 1966 | yes | no | $1,020 | 2/18/2005 |
| 11 | 160 Prospect Bldv., Fenton IL 62017 | 1952 | 4 | 2 | 2 | no | 1920 | no | no | $2,300 | 2/20/2005 |
| 12 | 36 Spratt Ln., Baron, IL 62019 | 1475 | 4 | 2 | 1 | no | 1964 | yes | yes | $1,110 | 2/20/2005 |
| 13 | 118 Main St., Hendricks, IL 62012 | 2140 | 5 | 2 | 2 | no | 1935 | yes | yes | $2,110 | 2/21/2005 |
| 14 | 234 Cottontail Rd., Baron, IL 62019 | 1980 | 4 | 3 | 2 | yes | 1930 | no | yes | $1,979 | 2/24/2005 |
| 15 | 677 Fir St., Hendricks, IL 62014 | 2320 | 5 | 3 | 2 | yes | 1927 | no | no | $2,380 | 2/28/2005 |

FIG. 4

| id | address | bedrooms | view | listing price | |
|---|---|---|---|---|---|
| | | | | tree 1 basis table | ← 600 |
| 2 | 96 Elm St., Hendricks, IL 62014 | 6 | no | $2,010 | ← 302 |
| 8 | 110 Muffet St., Baron, IL 62019 | 4 | no | $749 | ← 308 |
| 9 | 156 Elm St., Hendricks, IL 62014 | 6 | yes | $2,535 | ← 309 |
| 11 | 160 Prospect Bldv., Fenton IL 62017 | 4 | no | $2,300 | ← 311 |
| 13 | 118 Main St., Hendricks, IL 62012 | 5 | no | $2,110 | ← 313 |
| 15 | 677 Fir St., Hendricks, IL 62014 | 5 | yes | $2,380 | ← 315 |
| ↑321 | ↑322 | ↑324 | ↑327 | ↑329 | |

FIG. 6

FIG. 10 tree 1 scoring table — 1000

| id | address | bedrooms | view | listing price | market rental rate | error | |
|---|---|---|---|---|---|---|---|
| 1 | 1111 Main St., Hendricks, IL 62012 | 4 | no | $1,325 | $1,524 | 0.1506 | — 301 |
| 3 | 140 Cottontail Rd., Baron, IL 62019 | 3 | no | $987 | $1,524 | 0.5438 | — 303 |
| 4 | 6 Spratt Ln., Baron, IL 62019 | 2 | no | $1,065 | $1,524 | 0.4315 | — 304 |
| 5 | 776 Fir St., Hendricks, IL 62014 | 3 | yes | $2,510 | $1,524 | 0.3926 | — 305 |
| 6 | 111 Industry Ave., Fenton IL 62017 | 2 | no | $2,400 | $1,524 | 0.3648 | — 306 |
| 7 | 105 Elm St., Hendricks, IL 62014 | 5 | yes | $2,300 | $2,457 | 0.0685 | — 307 |
| 10 | 142 Cottontail Rd., Baron, IL 62019 | 3 | no | $1,020 | $1,524 | 0.4946 | — 310 |
| 12 | 36 Spratt Ln., Baron, IL 62019 | 4 | no | $1,110 | $1,524 | 0.3734 | — 312 |
| 14 | 234 Cottontail Rd., Baron, IL 62019 | 4 | yes | $1,979 | $1,524 | 0.2297 | — 314 |

321 — 322 — 324 — 327 — 329 — 1011 — 1012 median err. | 0.3734 | — 1051

AUTOMATICALLY DETERMINING MARKET RENTAL RATES FOR PROPERTIES

CROSS-REFERENCE TO RELATED APPLICATIONS

This application is related to the following applications, all of which are incorporated herein by reference in their entireties: U.S. patent application Ser. No. 11/347,000 filed on Feb. 3, 2006 (now U.S. Pat. No. 8,676,680), entitled "AUTOMATICALLY DETERMINING A CURRENT VALUE FOR A HOME"; U.S. patent application Ser. No. 11/347,024 filed on Feb. 3, 2006 (now U.S. Pat. No. 7,970,674), entitled "AUTOMATICALLY DETERMINING A CURRENT VALUE FOR A REAL ESTATE PROPERTY, SUCH AS A HOME, THAT IS TAILORED TO INPUT FROM A HUMAN USER, SUCH ITS OWNER"; U.S. patent application Ser. No. 11/524,048 filed on Sep. 19, 2006 (now U.S. Pat. No. 8,515,839), entitled "AUTOMATICALLY DETERMINING A CURRENT VALUE FOR A REAL ESTATE PROPERTY, SUCH AS A HOME, THAT IS TAILORED TO INPUT FROM A HUMAN USER, SUCH ITS OWNER"; and U.S. patent application Ser. No. 11/971,758 filed on Jan. 9, 2008 (now U.S. Pat. No. 8,140,421), entitled "AUTOMATICALLY DETERMINING A CURRENT VALUE FOR A HOME."

This application is related to the following applications, all of which are incorporated herein by reference in their entireties: U.S. patent application Ser. No. 13/044,490 filed on Mar. 9, 2011 (now U.S. Pat. No. 10,198,735), entitled "AUTOMATICALLY DETERMINING MARKET RENTAL RATE INDEX FOR PROPERTIES," and U.S. patent application Ser. No. 16/235,009 filed on Dec. 28, 2018, entitled "AUTOMATICALLY DETERMINING MARKET RENTAL RATE INDEX FOR PROPERTIES."

TECHNICAL FIELD

The described technology is directed to the field of information processing techniques relating to real estate.

BACKGROUND

The owner of a property, such as a condominium, a house, or a residential property of another type, can choose to offer the property for rent, which includes establishing a rental rate for the property.

BRIEF DESCRIPTION OF THE DRAWINGS

FIG. 4 is a table diagram showing sample contents of a recent listing table.

FIG. 6 is a table diagram showing sample contents of a basis table containing the basis information selected for the tree.

FIG. 10 is a table diagram showing sample results for scoring a tree.

DETAILED DESCRIPTION

Figure 1:
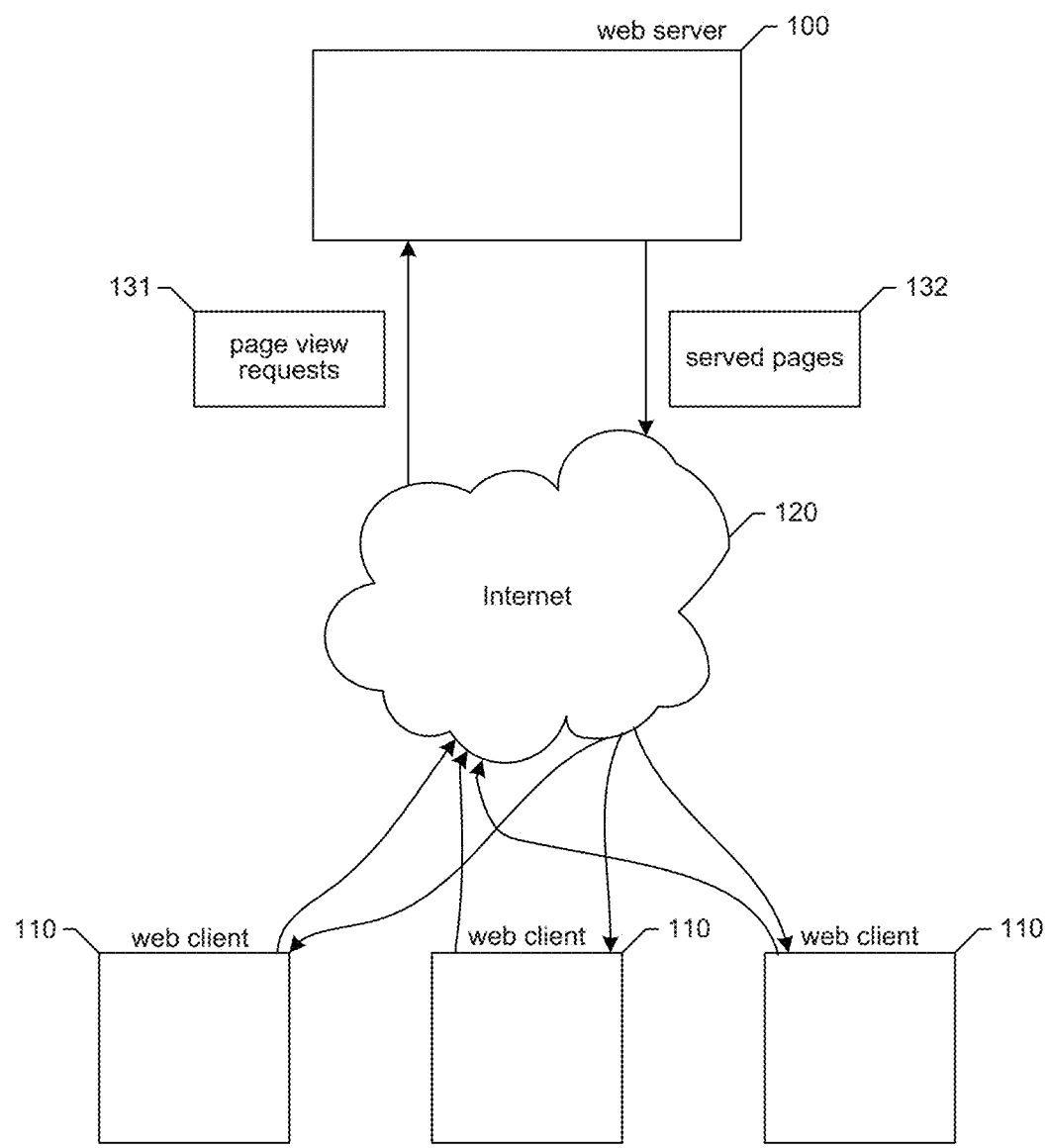
FIG. 1 is a high-level data flow diagram showing data flow within a typical arrangement of components used to provide the facility.

The inventors have recognized that it can be helpful to have access to a "market rental rate" for a property that seeks to identify the value of the property to its renter.

The inventors have recognized that conventional approaches to determining a market rental rate both take a great deal of effort and produce results whose level of accuracy is unknown. In particular, a person seeking to determine a market rental rate in a conventional manner typically must manually identify comparable properties that are being rented, determine their actual rental rates, and attempt to adjust and aggregate these determined actual rental rates.

Accordingly, the inventors have developed a software and/or hardware facility ("the facility") to automatically estimate market rental rates for properties such as residential properties. In some embodiments, the facility estimates market rental rates for substantially every residential property in a geographic region, including those that are not presently for rent or have never been rented.

The facility uses rental listings for properties within the geographic area, such as a particular county, each specifying an actual rental rate for the property, also called a "listing price," to train a model that predicts rental rate based upon some or all of property attributes, rental attributes, and estimated property value. In some embodiments, this model is a random classification tree forest, such as a quantile random forest. In order to estimate the rental rate for a subject property in the region, the facility applies the trained model to the information available about the subject property to yield an estimated market rental rate for the subject property.

In some embodiments, the facility displays market rental rates that it estimates as part of a property detail web page for each property. In some embodiments, the facility displays market rental rates that it estimates on a map showing some or all of the properties in the region. In some embodiments, the facility displays market rental rates that it estimates in a list of some or all of the properties in the region. In some embodiments, the set of properties for which market rental rates are shown can be filtered based on various criteria. These shown market rental rates can be aggregated or otherwise analyzed to characterize the properties that satisfy the filtering criteria.

In some embodiments, the facility aggregates market rental rates it estimates for properties within a geographic area—such as a country, state, county, city, neighborhood, census tract, electoral district, school district, zip code, zip+4, telephone area code or prefix, or named geographic areas of other types—to generate a market rental rate index for the geographic area. In some embodiments, the market rental rate index constitutes an absolute aggregated market rental rate for the geographic region, such as median or mean rental rate at a particular point in time for the geographic region. In some embodiments, the rental rate index constitutes a comparison of aggregated market rental rate for the geographic region between two different points in time, or a comparison of aggregated market rental rates for different geographic regions at the same point in time.

In some embodiments, the facility establishes and applies a set of four models: a first model that predicts rental rate based upon property attributes, rental attributes, and estimated property value; a second model that predicts rental rate based upon property attributes and rental attributes; a third model that predict rental rate based upon property attributes and estimated value; and a fourth model that predicts rental rate based upon only property attributes. In some embodiments, each of the four models is a random classification tree forest. In order to estimate the rental rate for a subject property in the region, the facility selects a model from the set whose independent variables most closely match the information available about the subject property, and applies the selected model to the information available about the subject property to yield an estimated market rental rate for the subject property.

In some embodiments, the facility trains and applies additional models or sets of models in order to predict extreme expected ranges of rental rates, such as an additional models or set of models trained to predict 1st to 15th percentile market rental rate and an additional models or set of models trained to predict 85th to 99th percentile market rental rate.

By estimating market rental rates, the facility can help a renter determine whether an actual rental rate offered for a particular property is a good deal, and can, in some cases, use it as a basis for negotiating downward an actual rental rate offered for that property. A renter can also use estimated market rental rates to seek out opportunities to rent particular properties whose market rental rates are affordable to him or her. The facility can help a landlord decide whether or not to rent out a particular property; what actual rental rate to initially establish for the property; and whether and when to update the actual rental rate for the property. The facility can help a lender decide whether to lend money to a prospective borrower proposing to purchase a particular property for rental purpose.

By determining a market rental rate index, the facility can assist people in deciding whether to build properties in a particular region, convert them to or from rental use, lend money to a builder or a landlord, plan to move a household or business to a geographic region, etc.

FIG. 1 is a high-level data flow diagram showing data flow within a typical arrangement of components used to provide the facility. A number of web client computer systems 110 that are under user control generate and send page view requests 231 to one or more logical web servers 100 via a network such as the Internet 120, such as page requests for pages that include market rental rates and/or market rental rate indices generated by the facility. Within the web server, these requests may either all be routed to a single web server computer system, or may be loaded-balanced among a number of web server computer systems. The web server typically replies to each with a served page 132. Web servers 100 may include computing nodes used to determine market rental rates and/or market rental rate indices, or such computing nodes may be remote from the web servers and simply make market rental rates and/or market rental rate indices determined by the facility available to the web servers.

While various embodiments are described in terms of the environment described above, those skilled in the art will appreciate that the facility may be implemented in a variety of other environments including a single, monolithic computer system, as well as various other combinations of computer systems or similar devices connected in various ways including cloud computing resources. In various embodiments, a variety of computing systems or other different client devices may be used in place of the web client computer systems, such as mobile phones, personal digital assistants, televisions and associated video sources, cameras, tablet computer systems, laptop computer systems, desktop computer systems, etc.

Figure 2:
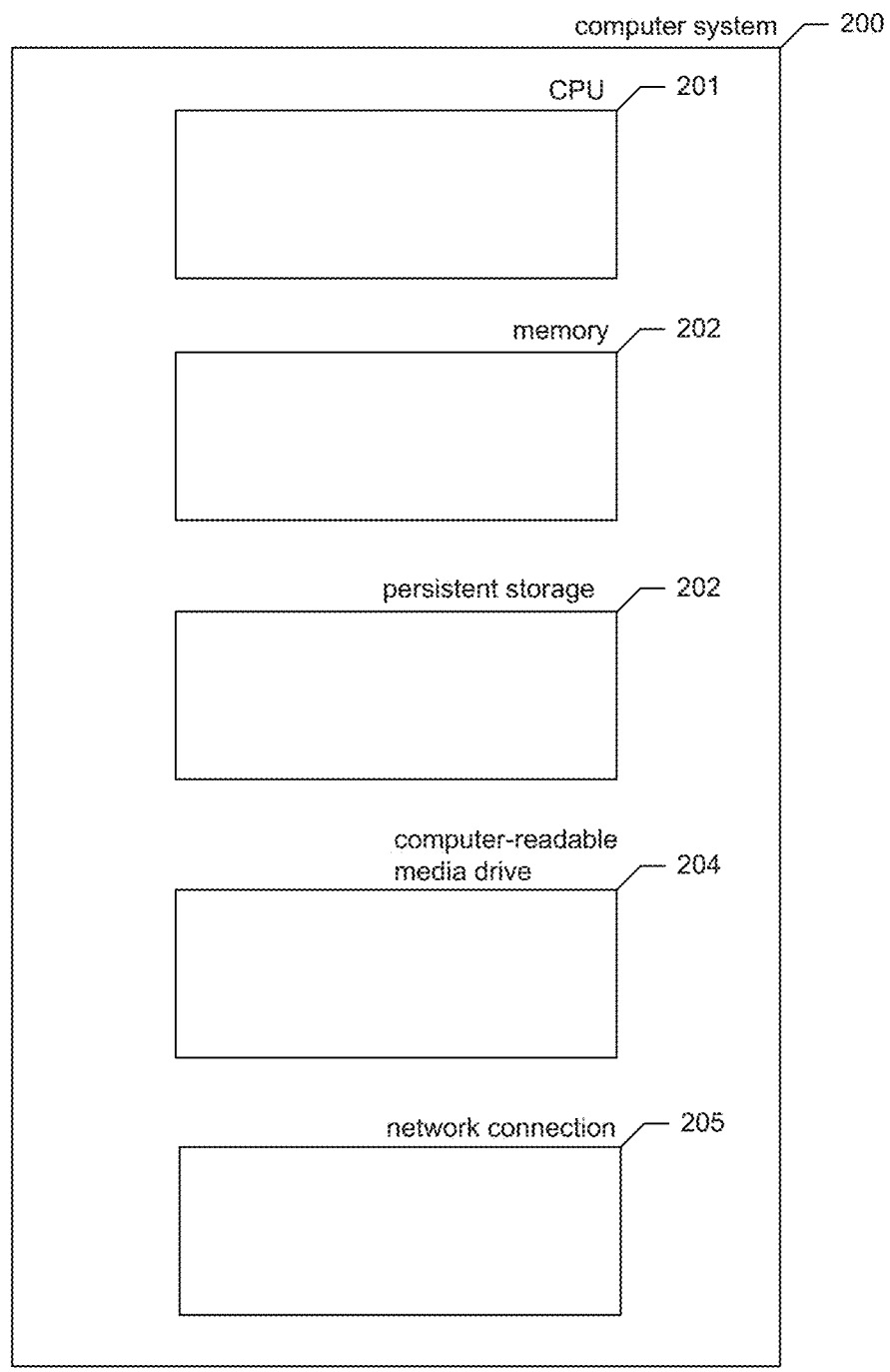
FIG. 2 is a block diagram showing some of the components typically incorporated in at least some of the computer systems and other devices on which the facility operates.

FIG. 2 is a block diagram showing some of the components typically incorporated in at least some of the computer systems and other devices on which the facility operates. In various embodiments, these computer systems and other devices 100 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit ("CPU") 201 for executing computer programs; a computer memory 202 for storing programs and data while they are being used, including the facility and associated data, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 3:
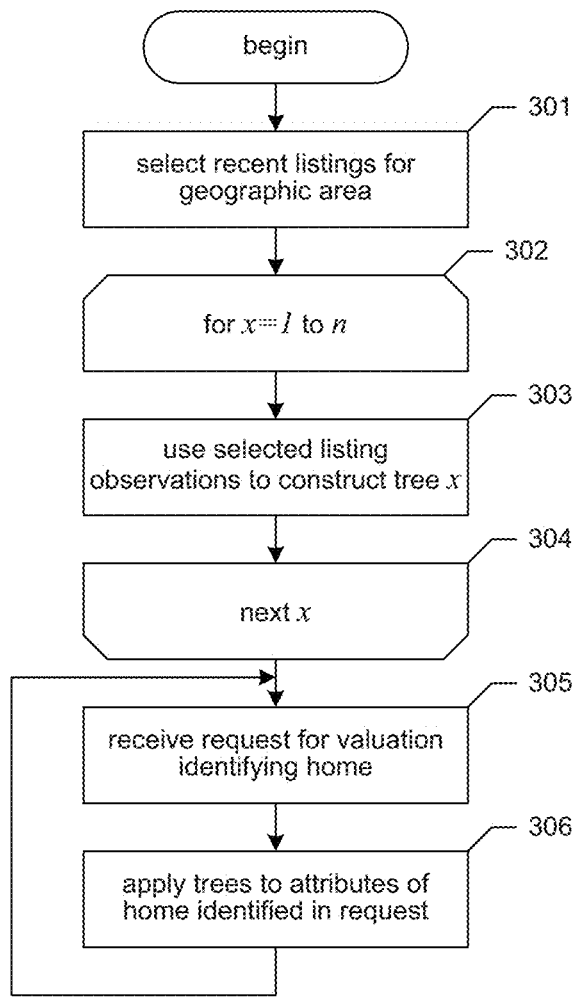
FIG. 3 is a flow diagram showing steps typically performed by the facility to automatically determine market rental rates for homes in a geographic area.

FIG. 3 is a flow diagram showing steps typically performed by the facility to automatically determine market rental rates for homes in a geographic area. The facility may perform these steps for one or more geographic areas of one or more different granularities, including neighborhood, city, county, state, province, country, zip code, zip+4, area code, electoral district, school district, school attendance boundary, census tract, etc. These steps may be performed periodically for each geographic area, such as daily, weekly, monthly, etc. In step 301, the facility selects recent property rental listings in the geographic area. The facility may use listing data obtained from a variety of public or private sources, and/or actual rental rate data.

FIG. 4 is a table diagram showing sample contents of a recent listing table. The recent listings table 400 is made up of rows 401-415, each representing a property listing that was published in a recent period of time, such as the preceding 60 days. Each row is divided into the following columns: an identifier column 421 containing an identifier for the listing; an address column 422 containing the address of the listed home; a square foot column 423 containing the floor area of the home; a bedrooms column 424 containing the number of bedrooms in the home; a bathrooms column 425 containing the number of bathrooms in the home; a floors column 426 containing the number of floors in the home; a view column 427 indicating whether the home has a view; a year column 428 showing the year in which the house was constructed; a Cat Allowed column 429 indicating whether the property's renter may have cats; an Electricity Included column 430 indicating whether the landlord will pay for electricity at no additional cost to the tenant; a selling price column 431 containing the selling price at which the home was sold; and a date column 432 showing the date on which the listing was published. For example, row 401 indicates that listing number 1 of the home at 111 Main St., Hendricks, Ill. 62012 having a floor area of 1850 square feet, 4 bedrooms, 2 bathrooms, 2 floors, no view, built in 1953, cats are not allowed and electricity is provided, was for the listing price of $1,325, and was published on Jan. 3, 2005. While the contents of recent listings table 400 were included to pose a comprehensible example, those skilled in the art will appreciate that the facility can use a recent listings table having columns corresponding to different and/or a larger number of attributes, as well as a larger number of rows. Attributes that may be used include, for example, property attributes such as construction materials, cooling technology, structure type, fireplace type, parking structure, driveway, heating technology, swimming pool type, roofing material, occupancy type, home design type, view type, view quality, lot size and dimensions, number of rooms, number of stories, school district, longitude and latitude, neighborhood or subdivision, tax assessment, attic, and other storage, etc. Attributes used may also include an automatically-generated valuation for the property. Attributes used may also include rental attributes available via rental listings, such as: whether a cat is allowed, whether a small dog is allowed, whether a large dog is allowed, whether water utilities are included, whether sewer utilities are included, whether garbage pickup is included, whether electricity utility is included, and whether gas utility is included. For a variety of reasons, certain values may be omitted from the recent listings table. In some embodiments, the facility imputes missing values using the median value in the same column for continuous variables, or the mode (i.e., most frequent) value for categorical values.

While FIG. 4 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; may contain a much larger number of rows than shown; etc.

Returning to FIG. 3, in steps 302-305, the facility constructs and scores a number of trees, such as 100. This number is configurable, with larger numbers typically yielding better results but requiring the application of greater computing resources. In step 303, the facility constructs a tree. In some embodiments, the facility constructs and applies random forest valuation models using an R mathematical software package available at cran.r-project.org/ and described at www.maths.lth.se/help/R/.R/library/randomForest/html/randomForest.html. Step 303 is discussed in greater detail below in connection with FIG. 4. In step 304, the facility scores the tree constructed in step 303. Step 304 is discussed in greater detail below in connection with FIG. 8.

In steps 306-307, the facility uses the forest of trees constructed and scored in steps 302-305 to process requests for market rental rates. Such requests may be individually issued by users, or issued by a program, such as a program that automatically requests market rental rates for all homes or substantially all homes in the geographic area at a standard frequency, such as daily, or a program that requests market rental rates for all of the homes occurring on a particular map in response to a request from a user to retrieve the map. In step 306, the facility receives a request for market rental rates identifying the home to be valued. In step 307, the facility applies the trees constructed in step 303, weighted by the scores generated for them in step 304, to the attributes of the home identified in the received request in order to obtain a market rental rate for the home identified in the request. After step 307, the facility continues in step 306 to receive the next request.

Those skilled in the art will appreciate that the steps shown in FIG. 3 and in each of the flow diagrams discussed below may be altered in a variety of ways. For example, the order of the steps may be rearranged; some steps may be performed in parallel; shown steps may be omitted, or other steps may be included; a shown step may be divided into substeps, or multiple shown steps may be combined into a single step, etc.

Figure 5A:
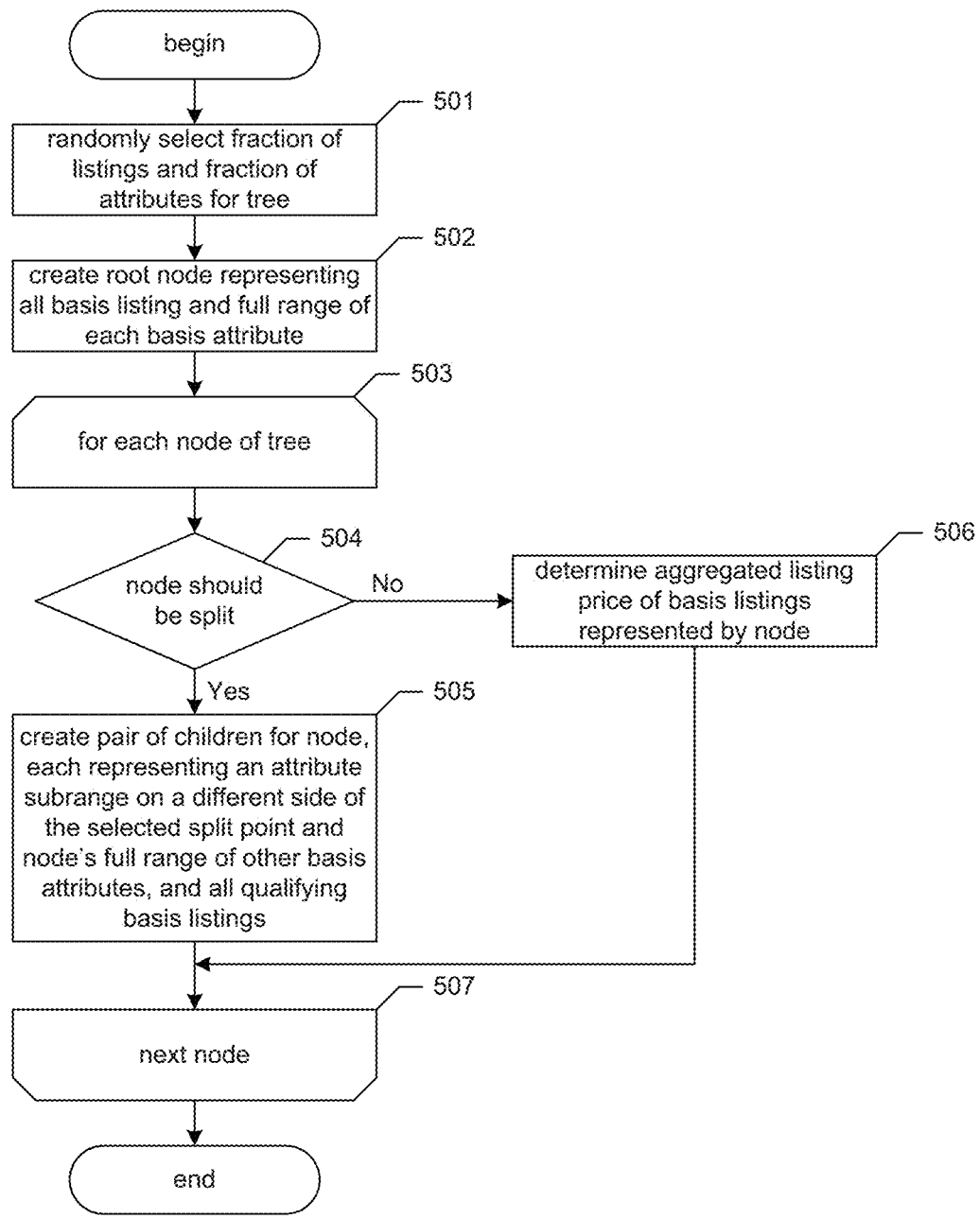
FIG. 5A is a flow diagram showing steps typically performed by the facility in order to construct a tree.

FIG. 5A is a flow diagram showing steps typically performed by the facility in order to construct a tree. In step 501, the facility randomly selects a fraction of the recent listings in the geographic area to which the tree corresponds, as well as a fraction of the available attributes, as a basis for the tree.

FIG. 6 is a table diagram showing sample contents of a basis table containing the basis information selected for the tree. Basis table 600 contains rows randomly selected from the recent listings table 400, here rows 402, 408, 309, 411, 413, and 415. The basis table further includes the identifier column 421, address column 422, and listing price column 429 from the recent listings table, as well as randomly selected columns for two available attributes: a bedrooms column 424 and a view column 427. In various embodiments, the facility selects various fractions of the rows and attribute columns of the recent listings table for inclusion in the basis table; here, the fraction one third is used for both.

Returning to FIG. 5A, in step 502, the facility creates a root node for the tree that represents all of the basis listings contained in the basis table and the full range of each of the basis attributes.

Figure 7:
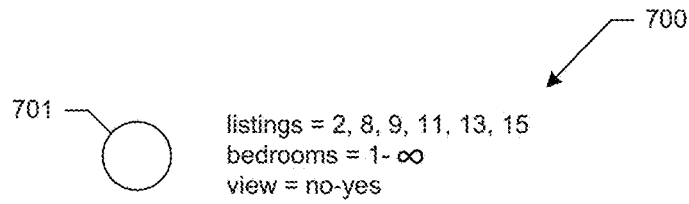
FIG. 7 is a tree diagram showing a root node corresponding to the basis table 600.

FIG. 7 is a tree diagram showing a root node corresponding to the basis table 600. The root node 701 represents the listings having identifiers 2, 8, 9, 11, 13, and 15; values of the bedrooms attribute between 1-∞; and values of the view attribute of yes and no.

Figure 5B:
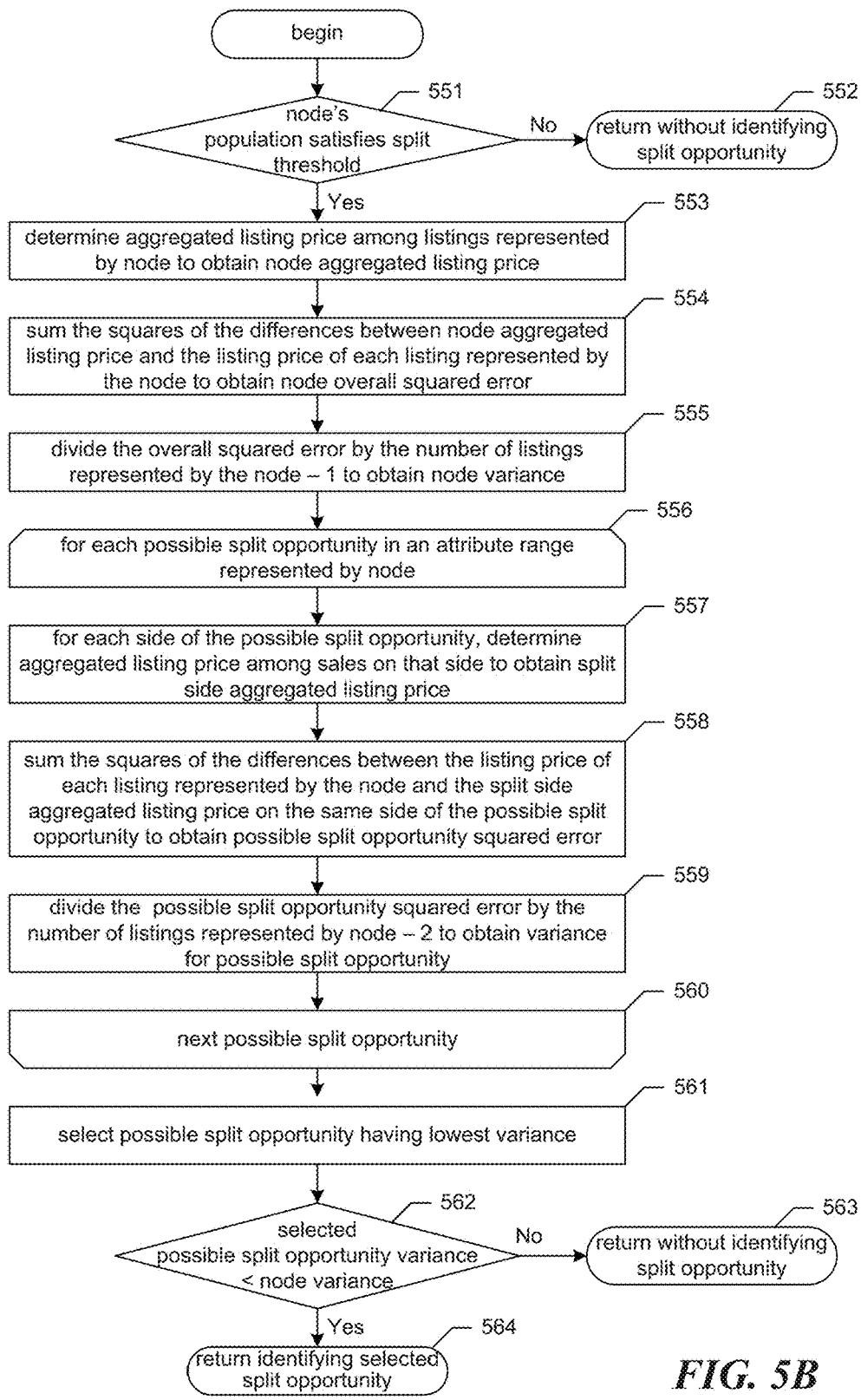
FIG. 5B is a flow diagram showing steps typically performed by the facility in order to determine whether and how to split a node of a tree.

Returning to FIG. 5A, in steps 503-507, the facility loops through each node of the tree, including both the root node created in step 502 and any additional nodes added to the tree in step 505. In step 504, if it is possible to "split" the node, i.e., create two children of the node each representing a different subrange of an attribute value range represented by the node, then the facility continues in step 505, else the facility continues in step 506. FIG. 5B is a flow diagram showing steps typically performed by the facility in order to determine whether and how to split a node of a tree. These steps generally identify a potential split opportunity having the highest information gain, and determine whether the information gain of that potential split opportunity exceeds the information gain of the current node. In step 551, the facility determines whether the node's population—that is, the number of basis listings represented by the node—satisfies a split threshold, such as a split threshold that requires more than three basis listings. If the threshold is not satisfied, then the facility returns to step 504 in step 552 without identifying any split opportunity, such that the facility will not split the node; otherwise, the facility continues in step 553. Though not shown, the facility may apply a variety of other tests to determine whether the node should be split, including whether any of the selected attribute ranges represented by the node is divisible. For example, where the selected attributes are bedrooms and view, and a node represents the ranges bedrooms=5 and view=no, none of the node's selected attribute ranges can be split.

In steps 553-555, the facility analyzes the characteristics of the node in order to be able to compare them to characteristics of pairs of possible child nodes that would result from different opportunities for splitting the node. In step 553, the facility determines the mean listing price among the listings represented by the node to obtain a node mean listing price for the node. Applying step 553 to root node 700 shown in FIG. 7, the facility determines a mean listing price for the node as shown below in Table 1 by determining the mean of all the listing prices shown in basis table 600. In some embodiments, the facility determines the median listing price rather than mean. In various embodiments, the facility uses a variety of other aggregation functions for this purpose. As used herein, an aggregation function is any function that receives multiple numerical values as input, and outputs a single numerical value that in some way characterizes the input values.

TABLE 1

| 1 | Node mean listing price = | $2,014 |
|---|---|---|

In step 554, the facility sums the squares of the differences between the node mean listing price determined in step 554 and the listing price of each listing represented by the node to obtain a node overall squared error. This calculation is shown below in table 2 for root node 701.

TABLE 2

| 2 | Listing 2 overall squared error = ($2,010-line 1)$^2$ = | 160 |
|---|---|---|
| 3 | Listing 8 overall squared error = ($749-line 1)$^2$ = | 1600225 |
| 4 | Listing 9 overall squared error = ($2,535-line 1)$^2$ = | 271441 |
| 5 | Listing 11 overall squared error = ($2,300-line 1)$^2$ = | 81796 |
| 6 | Listing 13 overall squared error = ($2,110-line 1)$^2$ = | 9216 |
| 7 | Listing 15 overall squared error = ($2,380-line 1)$^2$ = | 133956 |
| 8 | Node overall squared error = | 2096650 |

In step 555, the facility divides the overall squared error by one fewer than the number of listings represented by the node in order to obtain a node variance. The calculation of step 455 for root node 600 is shown below in table 3.

TABLE 3

| 9 | Node variance = line 8/5 = | 419330 |
|---|---|---|

In steps 556-560, the facility analyzes the characteristics of each possible split opportunity that exists in the node; that is, for each attribute range represented by the node, any point at which that range could be divided. For root node 700, three such split opportunities exist: (1) view=no/view=yes; (2) bedrooms<4/bedrooms>4; and (3) bedrooms<5/bedrooms>5. In step 557, for each side of the possible split opportunity, the facility determines the mean listing price among listings on that side to obtain a split side mean listing price. Table 4 below shows the performance of this calculation for both sides of each of the three possible split opportunities of root node 600.

TABLE 4

| 10 | Split side mean listing price of view = no side of possible split opportunity 1 = mean of listing prices for listings 2, 8, 11, and 13 = | $1,792 |
|---|---|---|
| 11 | Split side mean listing price of view = yes side of possible split opportunity 1 = mean of listing prices for listings 9 and 15 = | $2,457 |
| 12 | Split side mean listing price for bedrooms ≤ 4 side of possible split opportunity 2 = mean of listing prices of listings 8 and 11 = | $1,524 |
| 13 | Split side mean listing price for bedrooms > 4 side of possible split opportunity 2 = mean of listing prices of listings 2, 9, 13, and 15 = | $2,258 |
| 14 | Split side mean listing price for bedrooms ≤ 5 side of possible split opportunity 3 = mean of listing prices of listings 8, 11, 13, and 15 = | $1,884 |
| 15 | Split side mean listing price for bedrooms > 5 side of possible split opportunity 3 = mean of listing prices of listings 2 and 9 = | $2,272 |

In step 558, the facility sums the squares of the differences between the listing price of each listing represented by the node and the split side mean listing price on the same side of the possible split opportunity to obtain a possible split opportunity squared error. The result of the calculation of step 558 for root node 700 is shown below in table 5.

TABLE 5

| 16 | Possible split opportunity 1 squared error for listing 2 = ($2,010-line 10)$^2$ = | 47415 |
|---|---|---|
| 17 | Possible split opportunity 1 squared error for listing 8 = ($749-line 10)$^2$ = | 1088370 |
| 18 | Possible split opportunity 1 squared error for listing 9 = ($2,535-line 11)$^2$ = | 6006 |
| 19 | Possible split opportunity 1 squared error for listing 11 = ($2,300-line 10)$^2$ = | 257810 |
| 20 | Possible split opportunity 1 squared error for listing 13 = ($2,110-line 10)$^2$ = | 100965 |
| 21 | Possible split opportunity 1 squared error for listing 15 = ($2,380-line 11)$^2$ = | 6006 |
| 22 | Possible split opportunity 1 squared error = sum of lines 16-21 = | 1506573 |
| 23 | Possible split opportunity 2 squared error for listing 2 = ($2,010-line 13)$^2$ = | 61876 |
| 24 | Possible split opportunity 2 squared error for listing 8 = ($749-line 12)$^2$ = | 601400 |
| 25 | Possible split opportunity 2 squared error for listing 9 = ($2,535-line 13)$^2$ = | 76314 |
| 26 | Possible split opportunity 2 squared error for listing 11 = ($2,300-line 12)$^2$ = | 601400 |

TABLE 5-continued

| 27 | Possible split opportunity 2 squared error for listing 13 = ($2,110-line 13)² = | 22126 |
| 28 | Possible split opportunity 2 squared error for listing 15 = ($2,380-line 13)² = | 14701 |
| 29 | Possible split opportunity 2 squared error = sum of lines 23-28 = | 1377819 |
| 30 | Possible split opportunity 3 squared error for listing 2 = ($2,010-line 15)² = | 68906 |
| 31 | Possible split opportunity 3 squared error for listing 8 = ($749-line 14)² = | 1289928 |
| 32 | Possible split opportunity 3 squared error for listing 9 = ($2,535-line 15)² = | 68906 |
| 33 | Possible split opportunity 3 squared error for listing 11 = ($2,300-line 14)² = | 172432 |
| 34 | Possible split opportunity 3 squared error for listing 13 = ($2,110-line 14)² = | 50737 |
| 35 | Possible split opportunity 3 squared error for listing 15 = ($2,380-line 14)² = | 245272 |
| 36 | Possible split opportunity 3 squared error = sum of lines 30-35 = | 1896183 |

In line 559, the facility divides the possible split opportunity squared error by two less than the number of listings represented by the node to obtain a variance for the possible split opportunity. The calculation of step 559 is shown below for the three possible split opportunities of root node 700.

TABLE 6

| 37 | Variance for possible split opportunity 1 = line 22/4 = | 376643 |
| 38 | Variance for possible split opportunity 2 = line 29/4 = | 344454 |
| 39 | Variance for possible split opportunity 3 = line 36/4 = | 474045 |

In step 560, if another possible split opportunity remains to be processed, then the facility continues in step 556 to process the next possible split opportunity, else the facility continues in step 561.

In step 561, the facility selects the possible split opportunity having the lowest variance. In the example, the facility compares lines 37, 38 and 39 to identify the possible split opportunity 2 as having the lowest variance. In step 562, if the selected possible split opportunity variance determined in step 561 is less than the node variance determined in step 555, then the facility continues in step 564 to return, identifying the split opportunity selected in step 561, else the facility continues in step 563 to return without identifying a split opportunity. In the example, the facility compares line 38 to line 9, and accordingly determines to split the root node in accordance with split opportunity 2.

Returning to FIG. 5A, in step 505, where the steps shown in FIG. 5B determine that the node should be split, the facility creates a pair of children for the node. Each child represents one of the subranges of the split opportunity identified in step 504 and the node's full range of unselected attributes. Each child represents all basis listings whose attributes satisfy the attribute ranges represented by the child. Step 505 is discussed in greater detail below in connection with FIG. 8.

In step 506, because the node will be a leaf node, the facility determines the mean listing price of basis listings represented by the node.

In step 507, the facility processes the next node of the tree. After step 507, these steps conclude.

Figure 8:
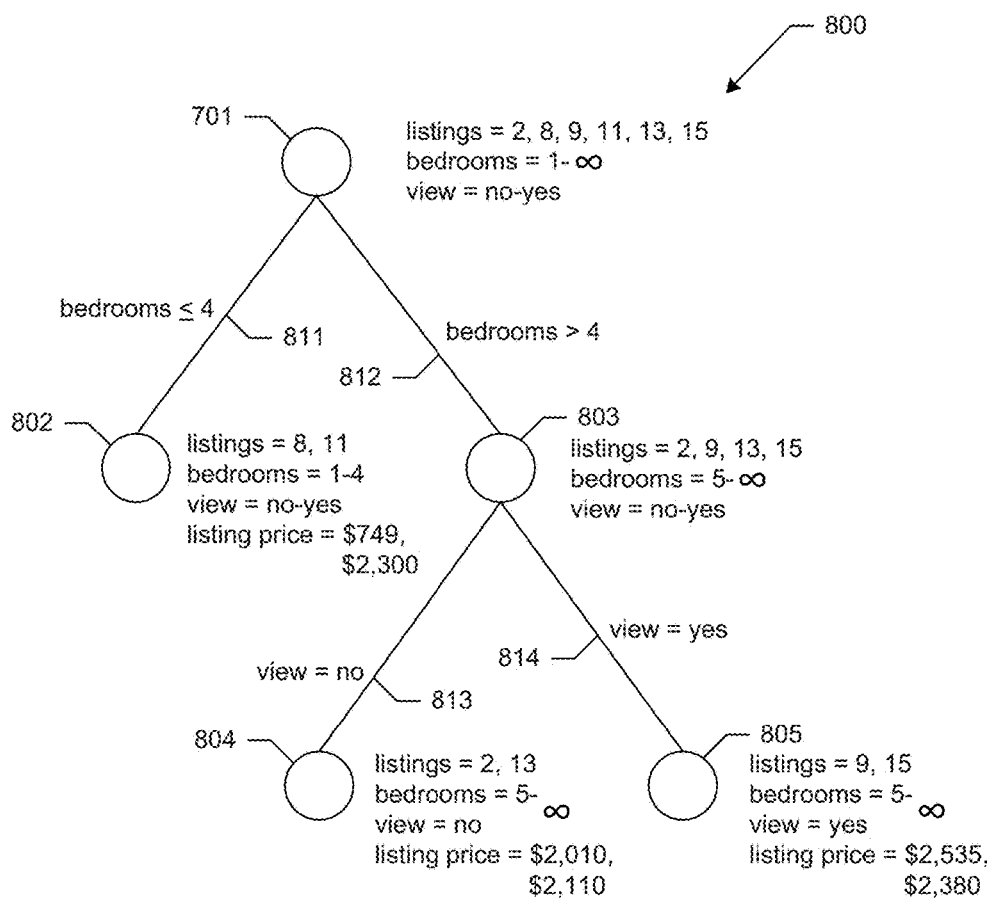
FIG. 8 is a tree diagram showing a completed version of the sample tree.

FIG. 8 is a tree diagram showing a completed version of the sample tree. It can be seen that the facility added child nodes 802 and 803 to root node 701, corresponding to the subranges defined by the split opportunity selected in step 561. Node 802 represents listings whose bedrooms attribute is less than or equal to 4, that is, between 1 and 4, as well as the full range of view attribute values represented by node 701. Accordingly, node 802 represents listings 8 and 11, having listing prices $749 and $2,300. Because this number of listings is below the threshold of 4, node 802 qualifies as a leaf node.

Node 803 represents listings with bedrooms attribute values greater than 4, that is, 5-∞. Node 803 further represents the full range of view attributes values for node 701. Accordingly, node 803 represents listings 2, 9, 13, and 15. Because this number of listings is not smaller than the threshold number and the node's ranges are not indivisible, the facility proceeded to consider possible split opportunities. In order to do so, the facility performs the calculation shown below in Table 7. For the following two possible split opportunities: (4) view=no/view=yes; and (5) bedrooms=5/bedrooms>5.

TABLE 7

| 40 | node mean listing price = mean of listing prices for listings 2, 9, 13, and 15 = | $2,258 |
| 41 | listing 2 overall squared error = ($2,010-line 40)² = | 61876 |
| 42 | listing 9 overall squared error = ($2,535-line 40)² = | 7631 |
| 43 | listing 13 overall squared error = ($2,110-line 40)² = | 22126 |
| 44 | listing 15 overall squared error = ($2,380-line 40)² = | 14701 |
| 45 | node overall squared error = | 175018 |
| 46 | node variance = line 45/3 = | 58339 |
| 47 | split side mean listing price of view = no side of possible split opportunity 4 = mean listing prices of listings 2 and 13 = | $2,060 |
| 48 | split side mean listing price of view = yes side of possible split opportunity 4 = mean listing prices of listings 9 and 15 = | $2,457 |
| 49 | split side mean listing price for bedrooms ≤ 5 side of possible split opportunity 5 = mean listing prices of listings 13 and 15 = | $2,245 |
| 50 | split side mean listing price of bedrooms > 5 side of possible split opportunity 5 = mean listing prices of listings 2 and 9 = | $2,272 |
| 51 | possible split opportunity 4 squared error for listing 2 = ($2,010-line 47)² = | 2500 |
| 52 | possible split opportunity 4 squared error for listing 9 = ($2,535-line 48)² = | 6006 |
| 53 | possible split opportunity 4 squared error for listing 13 = ($2,110-line 47)² = | 2500 |
| 54 | possible split opportunity 4 squared error for listing 15 = ($2,380-line 48)² = | 6006 |
| 55 | possible split opportunity 4 squared error = sum of lines 51-54 = | 1701 |
| 56 | possible split opportunity 5 squared error for listing 2 = ($2,010-line 50)² = | 68906 |
| 57 | possible split opportunity 5 squared error for listing 9 = ($2,535-line 50)² = | 68906 |
| 58 | possible split opportunity 5 squared error for listing 13 = ($2,110-line 49)² = | 18225 |
| 59 | possible split opportunity 5 squared error for listing 15 = ($2,380-line 49)² = | 18225 |
| 60 | possible split opportunity 5 squared error = sum of lines 56-59 = | 174262 |
| 61 | variance for possible split opportunity 4 = line 55/2 = | 8506 |
| 62 | variance for possible split opportunity 5 = line 60/2 = | 87131 |

From Table 7, it can be seen that, between split opportunities 4 and 5, split opportunity 4 has the smaller variance, shown on line 61. It can further be seen that the variance of possible split opportunity 4 shown on line 61 is smaller than the node variance shown on line 46. Accordingly, the facility uses possible split opportunity 4 to split node 703, creating child nodes 704 and 705. Child node 704 represents basis listings 2 and 13 having listing prices $2,010 and $2,110, and attribute ranges bedrooms=5-∞ and view=no. Node 705 represents base of listings 9 and 15 having listing prices $2,330 and $2,380, and attribute value ranges bedrooms=5-∞ and view=yes.

In order to apply the completed tree 700 shown in FIG. 7 to obtain its valuation for a particular home, the facility retrieves that home's attributes. As an example, consider a home having attribute values bedrooms=5 and view=yes. The facility begins at root node 701, and among edges 811 and 812, traverses the one whose condition is satisfied by the attributes of the home. In the example, because the value of the bedroom's attribute for the home is 5, the facility traverses edge 812 to node 803. In order to proceed from node 803, the facility determines, among edges 813 and 814, which edge's condition is satisfied. Because the home's value of the view attribute is yes, the facility traverses edge 814 to leaf node 805. The facility then combines the listing prices represented by leaf node 805 with those represented by the leaf nodes representing the home by the other trees of the forest, and selects the median as the forest's valuation of the home.

Those skilled in the art will appreciate that the tree shown in FIG. 8 may not be representative in all respects of trees constructed by the facility. For example, such trees may have a larger number of nodes, and/or a larger depth. Also, though not shown in this tree, a single attribute may be split multiple times, i.e., in multiple levels of the tree.

Figure 9:
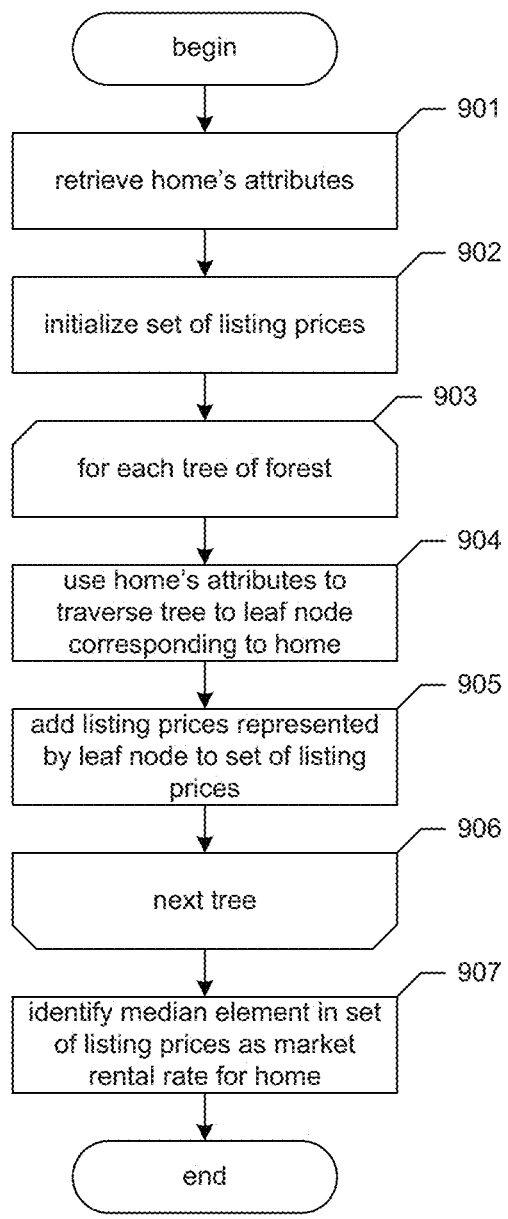
FIG. 9 shows steps typically performed by the facility in order to apply a forest of trees to obtain a market rental rate for a home.

FIG. 9 shows steps typically performed by the facility in order to apply a forest of trees to obtain a market rental rate for a home. In step 901, the facility retrieves the home's attributes. In step 902, the facility initializes a set of listing prices. In steps 903-906, the facility loops through each tree of the forest. In step 904, the facility uses the home's attributes retrieved in step 901 to traverse the tree to a leaf corresponding to the home and its attributes. In step 905, the facility copies from the leaf node traversed-to in step 904, the list of the listing prices of basis listings represented by the leaf node. In step 906, if additional trees of the forest remain to be processed, then the facility continues in step 903 to process the next tree, else the facility continues in step 907. In step 907, the facility identifies as its market rental rate for the home a median element in the set of listing prices accumulated in step 905. In some embodiments, the facility further selects from this set of listing prices the 15$^{th}$ percentile and 85$^{th}$ percentile as the lower and upper endpoints, respectively, of a range, or "confidence interval," about the determined market rental rate. In some embodiments, this range is displayed or otherwise provided together with the determined market rental rate. After step 907, the steps conclude.

In various embodiments, the facility pursues various approaches to using the listing price information associated with the leaf of each tree corresponding to the subject home and its attributes to obtain a market rental rate. In some embodiments, individual listing prices for listing observations associated with the traversed-to nodes are collected across all of the trees as described, then aggregated using an aggregation function. In some embodiments, however, the listing prices for these observations are aggregated once within the traversed-to leaf node of each tree, then a second time across trees. In various embodiments, various aggregation functions are used for any of these aggregation operations, including median, mean, mode, and others.

FIG. 10 is a table diagram showing sample results for scoring a tree. Scoring table 1000 scores tree 800 based upon the contents of recent listings table 400. The scoring table is made up of the rows of recent listings table 400 other than those used as basis listings for constructing the tree, i.e., rows 401, 403, 404, 405, 406, 407, 410, 412, and 414. It further contains the following columns from recent listings table 400: identifier column 421, address column 422, bedroom column 424, view column 427, and listing price column 429. The scoring table further contains a market rental rate column 1011 containing the market rental rate determined for each home in step 903. For example, row 407 shows that the facility determines the market rental rate of $2,457 for listing 7 using tree 800. In particular, the facility begins at root node 701; traverses to node 803 because the number of bedrooms 5 is greater than 4; traverses to node 805 because view=yes; and adopts the market rental rate of node 805, $2,457. Scoring table 1000 further contains an error column 1012 indicating the difference between each home's market rental rate and listing price. For example, row 407 contains an error of 0.0685, the difference between market rental rate $2,457 and listing price $2,300, divided by listing price $2,300. Associated with the table is a median error field 1051 containing the median of error values in the scoring table, or 0.3734. Each tree's median error value is used to determine weightings for the trees that are inversely related to their median error values. In some embodiments, the facility determines the particular tree's weighting by generating an accuracy metric for each tree by subtracting its median error value from 1, and dividing the tree's accuracy measure by the sum of all of the trees' accuracy measures. Also, a variety of different approaches to determine a score that is negatively correlated with the average error may be used by the facility.

When a market rental rate is determined for a home using the forest, the sample tree will be applied to the attributes of the home in the same way it was applied to homes in the scoring process described above. (If any attributes of the home are missing, the facility typically imputes a value for the missing attribute based upon the median or mode for that attribute in the recent listings table.) The market rental rate produced will be averaged with the market rental rates produced by the other trees of the forest. In the average or other aggregation, each market rental rate will be weighted by the score attributed by the facility to the tree. This resultant average is presented as the market rental rate for the home.

Figure 11:
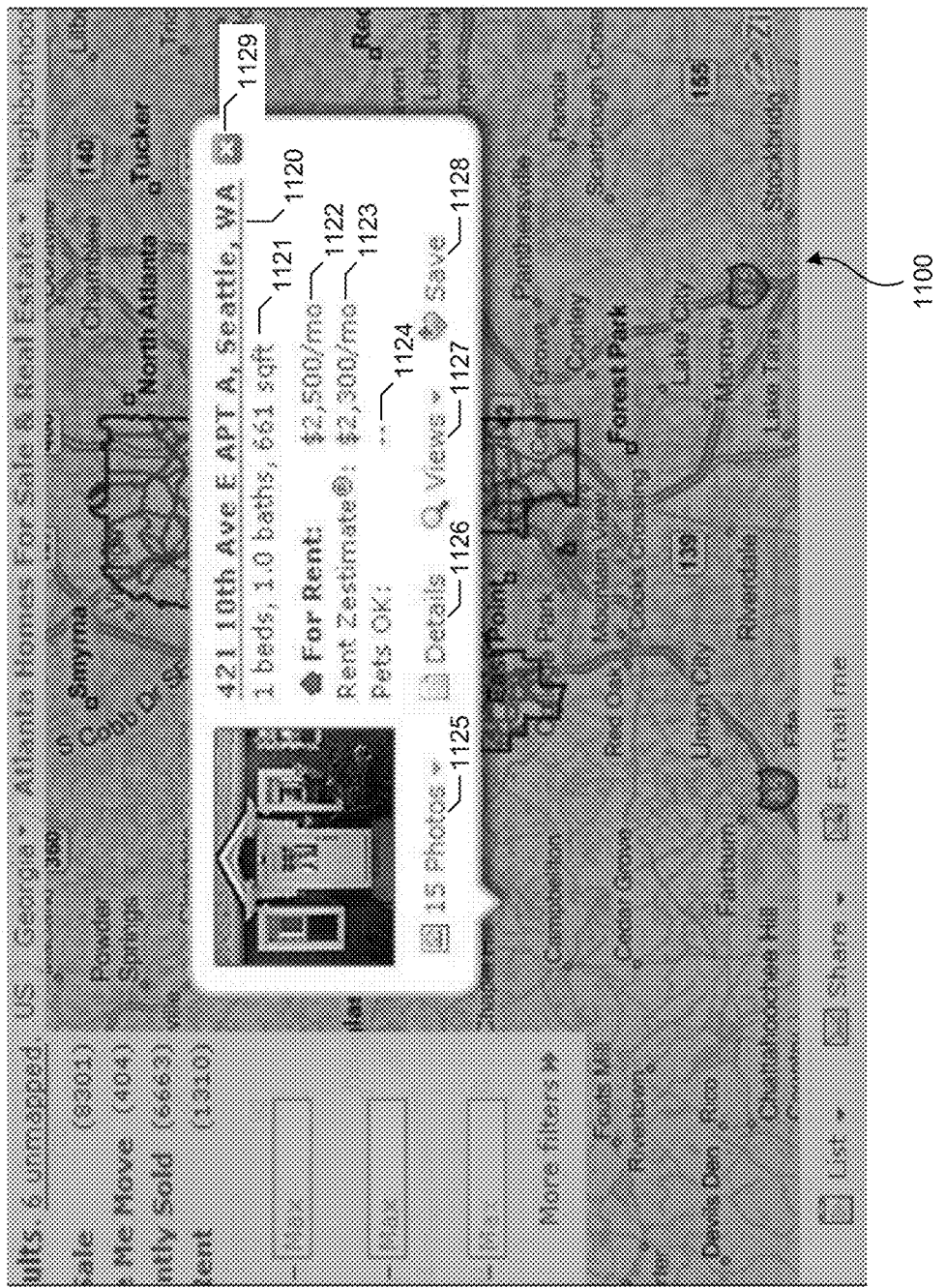
FIG. 11 is a display diagram showing the presentation of a sample market rental rate in a map bubble.
Figure 12:
FIG. 12 is a display diagram showing a sample home detail page for a home that includes a market rental rate determined for the home by the facility.
Figure 13:
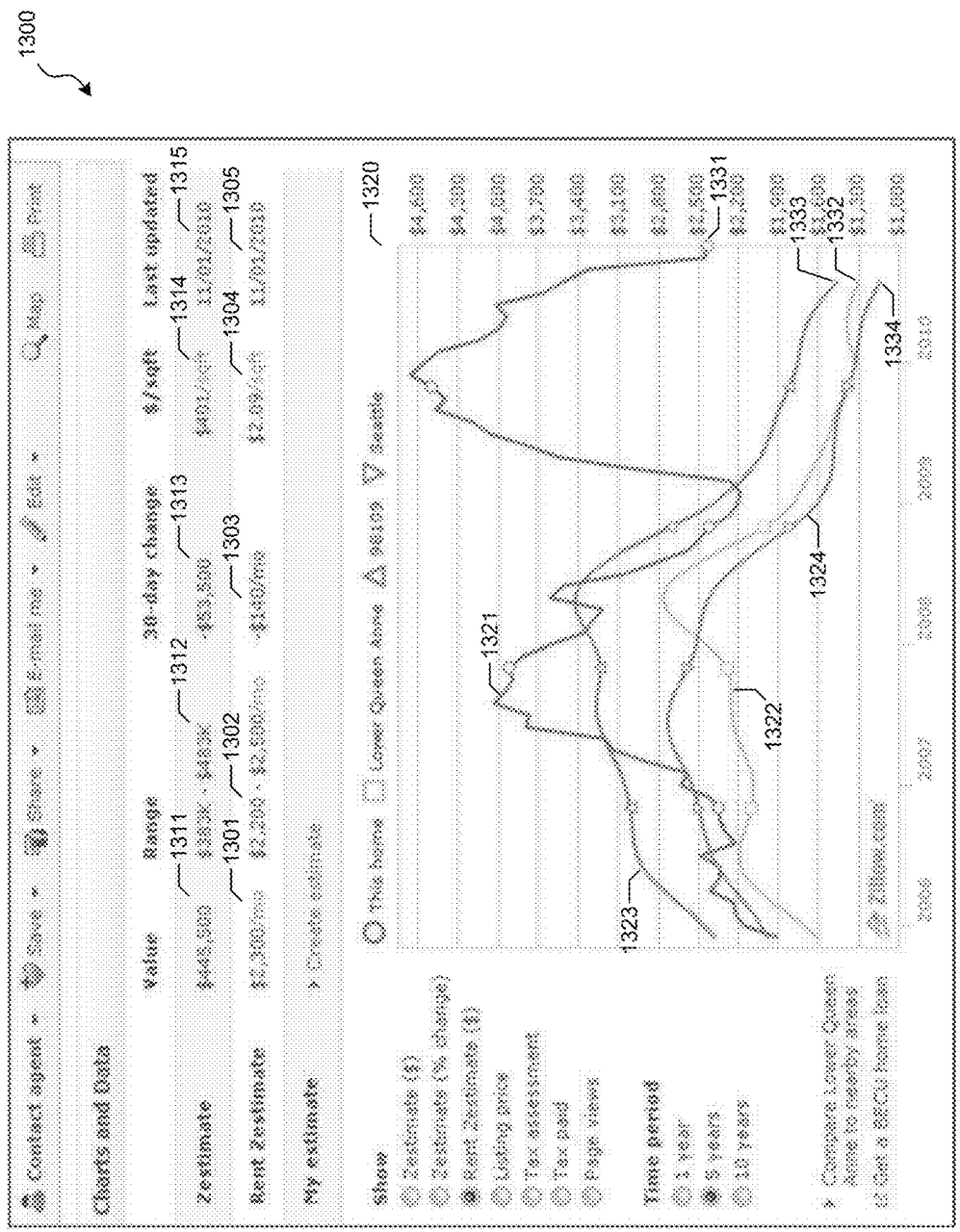
FIG. 13 is a display diagram showing a sample charts and data page for a home that includes a market rental rate determined for the home by the facility.

FIGS. 11-13 show different ways that the facility displays or publishes market rental rates that it determines for properties. FIG. 11 is a display diagram showing the presentation of a sample market rental rate in a map bubble. The display includes a map 1100, which is augmented with a "bubble" window 1110. The bubble includes identifying information 1120 for the home, such as address; selected home attributes 1121; a rental listing price for the home 1122; a market rental rate for the home 1123; a pets allowed attribute 1124; a control 1125 for displaying photos for the home; a control 1126 for displaying additional attributes and other details of the home; a control 1127 for displaying views of or from the home; and a control 1128 for saving the home to a group of the user's favorite homes. By clicking on control 1126 or link 1120, the user can cause the facility to display a home detail page for the home.

FIG. 12 is a display diagram showing a sample home detail page for a home that includes a market rental rate determined for the home by the facility. The home detail page 1200 includes identifying information 1201 for the home, such as an address; a rental listing price 1202; a market rental rate 1203 determined for the home; a deposit and fees amount 1204 relating to the rental of the house; property attributes 1205-1211 and 1214; rental attributes 1212 and 1213; description 1215; photo 1216; and view 1217. By clicking a charts and data link on the home detail page (not shown), the user can cause the facility to display charts and data relating to the home.

FIG. 13 is a display diagram showing a sample charts and data page for a home that includes a market rental rate determined for the home by the facility. The charts and data page 1300 includes a market rental rate 1301 for the home; a confidence interval 1302 about the market rental rate; an indication 1303 of a change in the market rental rate compared to 30 days ago; an indication 1304 of the market rental rate per square foot; and an indication 1305 of the date on which the market rental rate was determined for the home. The page also has similar information 1311-1315 relating to an estimated value automatically determined for the home, i.e., the selling price the home would fetch if purchased today. The page also includes a graph 1320 where the market rental rate is plotted over time 1321, ending up at a current market rental rate 1331.

Figure 14:
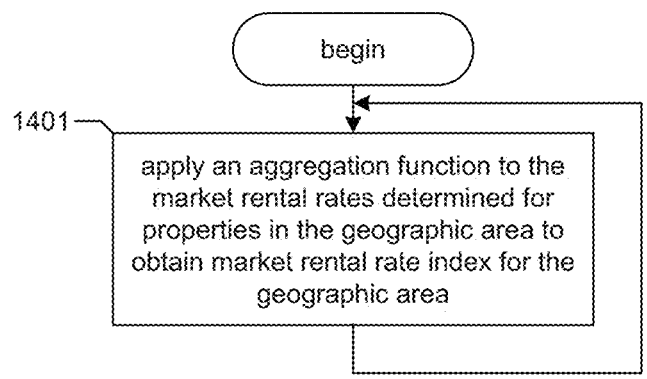
FIG. 14 is a flow diagram showing steps typically performed by the facility in order to determine a market rental rate index for a geographic area, such as a named geographic area.

FIG. 14 is a flow diagram showing steps typically performed by the facility in order to determine a market rental rate index for a geographic area, such as a named geographic area. The geographic area can be the geographic area for which the facility established a market rental rate model, or some other geographic area for which market rental rates are largely available. In step 1401, the facility applies an aggregation function to the market rental rates determined for properties in the geographic area—such as substantially all of the properties in the geographic area—to obtain a market rental rate index for the geographic area. In various embodiments, the aggregation function is median, mean, mode, percentile, or any other suitable aggregation function. After step 1401, the facility continues in step 1401 after some period of time to repeat the determination of the market rental rate index for the geographic area.

Figure 15:
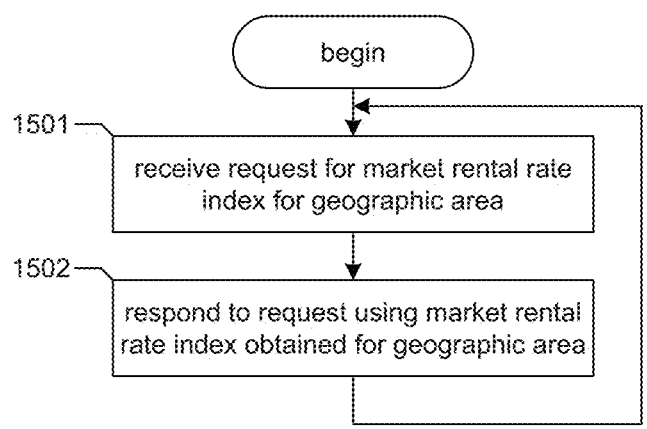
FIG. 15 is a flow diagram showing steps typically performed by the facility in order to present the market rental rate index determined for a geographic area.

FIG. 15 is a flow diagram showing steps typically performed by the facility in order to present the market rental rate index determined for a geographic area. In step 1501, the facility receives a request for a market rental rate index for a geographic area. In step 1502, the facility responds to the request using market rental rate index obtained for the geographic area in step 1301, after step 1502, the facility continues in step 1501 to receive and process the next request. Returning to FIG. 13, the graph 1320 further shows the plotting of three market rental rate indices over time: a market rental rate index 1322 for the Lower Queen Anne neighborhood geographic area; a market rate index 1323 for the 98109 zip code geographic area; and a market rental rate index 1324 for the Seattle city geographic area. Current values for these indices are similarly shown at the right-hand side of each of these time serves curves.

In some embodiments, the facility trains and applies additional models in order to predict extreme expected ranges of market rental rates, such as an additional model trained to predict first to $15^{th}$ percentile market rental rate and an additional model train to predict $85^{th}$-$99^{th}$ percentile market rental rate. The facility trains these extreme models using only those observations whose listing prices fall in the range of listing prices defined for the model. In various embodiments, the facility uses various techniques to determine whether to use one of the extreme models in determining the market rental rate for a property. In some embodiments, the facility simply applies the primary market rental rate model, and determines whether the obtained market rental rate is above or below certain threshold values; if so, the facility applies the appropriate extreme model, and reports the result as the market rental rate for the property. In some embodiments, the facility determines whether to apply an extreme model based upon the amount of an automated valuation determined for the property. In some embodiments, the facility trains and employs a specialized screening model that maps from attributes of the property to a decision about whether or not to apply an extreme model to determine market rental rate for the property. Such specialized screening models can be of a wide variety of types, including a random forest model or other decision tree-based modeling technique.

In some embodiments, the facility smoothes market rental rates determined for properties based upon its models with listing prices recently published for a property, as adjusted in accordance with the trends exhibited by an appropriate market rental rate index.

In some embodiments, the facility smoothes the market rental rate indices it determines for geographic areas by the following process. First, the facility determines a raw median value for various subcategories of properties: price tiers, all homes, single family homes, condos and co-ops, one bedroom homes, two bedroom homes, three bedroom homes, four bedroom homes, five-plus bedroom homes, certain ranges of price per square foot, and percent changes for one year ago. The facility counts the homes included in each of these subcategories. The facility obtains time series data for each subcategory including both raw median and count. The facility then applies weighted spline smoothing to the raw median using the count as the weight to produce a final smooth time series for the index.

It will be appreciated by those skilled in the art that the above-described facility may be straightforwardly adapted or extended in various ways. For example, in various embodiments, the facility determines market rental rates and/or market rental rate indices for properties of a wide variety of types. While the foregoing description makes reference to particular embodiments, the scope of the invention is defined solely by the claims that follow and the elements recited therein.

We claim:

1. A method for estimating a market rental rate for a home located in a specific geographic area, comprising:
   retrieving data for the specific geographic area, the data comprising a plurality of entries each for a home located in the specific geographic area that was listed for rental after a specific date, each entry indicating (1) a rental listing price for the home, and, (2) values for each of a plurality of attributes including (a) rental attributes, (b) property attributes, and (c) an estimated home value attribute;
   training, by a computer, a forest of classification trees to estimate a market rental rate for a home in the specific geographic area using the data retrieved for the specific geographic area;
   receiving attributes of a plurality of homes in the specific geographic area;
   periodically generating a market rental rate index for the specific geographic area at least in part by, for each home of the plurality of homes in the specific geographic area, applying the trained forest of classification trees to the received attributes of the home to determine a market rental rate for the home;
   determining a market rental rate index for the specific geographic area using the market rental rates determined for each home of the plurality of homes in the specific geographic area; and
   causing the determined market rental rate index for the specific geographic area to be provided to a user to enable the user to make a determination regarding a home in the specific geographic area.

2. The method of claim 1, wherein determining the market rental rate of the home comprises:

for each classification tree of the trained forest of classification trees,
  identifying a leaf node of the classification tree representing attribute ranges containing the home's attributes, and
  determining a weight for the classification tree based on its score; and
determining the market rental rate for the home based at least in part on an aggregation of the prices of the identified leaf nodes in the weighted classification trees.

3. The method of claim 2, wherein the aggregation determines a mode of the market rental rates.

4. The method of claim 2, wherein the aggregation determines a percentile of the market rental rates.

5. The method of claim 2 wherein the aggregation determines a median of the market rental rates.

6. The method of claim 1, further comprising smoothing out a plurality of market rental rate indices periodically generated for the specific geographic area, wherein the plurality of market rental rate indices include at least a first generated market rental rate index and a second generated market rental rate index, wherein the first generated market rental rate index is different from the second generated market rental rate index.

7. The method of claim 6 wherein smoothing out a plurality of market rental rate indices generated for the specific geographic area comprises:
for each of a plurality of subcategories of homes within the specific geographic area,
  determining a raw median value for the subcategory of homes within the specific geographic area,
  counting the homes included in the subcategory of homes within the specific geographic area,
  determining a weight to apply to the raw median value based on the count of homes included in the subcategory of homes within the specific geographic area.

8. The method of claim 6 wherein the plurality of subcategories of homes within the specific geographic area include price tiers, all homes, single family homes, condos and co-ops, one bedroom homes, two bedroom homes, three bedroom homes, four bedroom homes, and five-plus bedroom homes.

9. A method in a computing system for estimating a market rental rate for a specific home located in a specific geographic area, comprising:
identifying listing information for each of a plurality of homes in the specific geographic area listed for rental after a specific past date, the listing information including (1) values for each of: (a) at least one property attribute, (b) an estimated home value attribute, (c) at least one rental attribute, and (2) a rental listing price for each home;
training, by a computer, an initialized market rental rate model to estimate a market rental rate for a home in the specific geographic area using the identified listing information;
periodically generating a market rental rate index for the specific geographic area at least in part by, for each home of the plurality of homes in the specific geographic area, applying the trained market rental rate model to attributes of the home to determine a market rental rate for the home;
determining a market rental rate index for the specific geographic area using the market rental rates estimated for each home of the plurality of homes in the specific geographic area; and
causing a determined market rental rate for a specific home to be provided to a user to enable the user to make a determination regarding the specific home.

10. The method of claim 9 wherein the market rental rate model is trained using the identified listing information for a first fraction of homes in the specific geographic area listed for rental after the specific past date, the method further comprising:
selecting a second fraction of homes in the specific geographic area listed for rental after the specific past date that is distinct from the first fraction; and
using identified listing information for the second faction of homes to validate the trained market rental rate model by determining the extent to which the trained market rental rate model's market rental rates for the homes of the second fraction diverges from the rental listing prices of the homes of the second fraction.

11. The method of claim 9 wherein the market rental rate model is a forest of classification trees each specifying a market rental rate for a combination of attributes.

12. The method of claim 11 wherein the forest of classification trees is weighted based upon its level of success in determining market rental rates for homes in the specific geographic area that were listed for rental after a specific past date, other than those used to train the model.

13. The method of claim 9, further comprising:
smoothing out a plurality of market rental rate indices periodically generated for the specific geographic area, wherein the plurality of market rental rate indices include at least a first generated market rental rate index and a second generated market rental rate index, wherein the first generated market rental rate index is different from the second generated market rental rate index.

14. The method of claim 9, further comprising:
identifying a home in the specific geographic area listed for rental after the specific past date having an attribute for which no value is available; and
in response to the identifying, imputing a value of the attribute for the identified home.

15. The method of claim 14, further comprising choosing as the imputed attribute value the median value of the attribute among homes in the specific geographic area listed for rental after the specific past date.

16. The method of claim 14, further comprising choosing as the imputed attribute value the mode value of the attribute among homes in the specific geographic area listed for rental after the specific date.

17. The method of claim 14, further comprising applying to the attribute for which no value is available a model that specifies the imputed attribute value.

18. The method of claim 17 wherein the model applied to specify the imputed attribute value is a regression model.

19. The method of claim 9, further comprising:
identifying a home in the specific geographic area listed for rental after the specific past date for which no listing price is available; and
in response to the identifying, imputing a listing price for the identified home.

20. A computer-readable hardware memory having contents configured to cause a computing system to perform a method for estimating a market rental rate for a home located in a specific geographic area, the method comprising:
retrieving data for the specific geographic area, the data comprising a plurality of entries each for a home located in the specific geographic area that was listed for rental after a specific date, each entry indicating (1) a rental listing price for the home, and, (2) values for each of a plurality of attributes including (a) rental attributes, (b) property attributes, and (c) an estimated home value attribute;

training, by a computer, a forest of classification trees to estimate a market rental rate for a home in the specific geographic area using the data retrieved for the specific geographic area;

receiving attributes of a plurality of homes in the specific geographic area;

periodically generating a market rental rate index for the specific geographic area at least in part by, for each home of the plurality of homes in the specific geographic area, applying the trained forest of classification trees to the received attributes of the home to determine a market rental rate for the home;

determining a market rental rate index for the specific geographic area using the market rental rates determined for each home of the plurality of homes in the specific geographic area; and causing the determined market rental rate index for the specific geographic area to be provided to a user to enable the user to make a determination regarding a home in the specific geographic area.

21. A computer-readable hardware memory having contents configured to cause a computing system to perform a method for estimating a market rental rate for a home located in a specific geographic area, the method comprising:

identifying listing information for each of a plurality of homes in the specific geographic area listed for rental after a specific past date, the listing information including (1) values for (a) property attributes, (b) an estimated home value attribute, (c) rental attributes, and (2) a rental listing price for each home;

training an initialized market rental rate model to estimate a market rental rate for a home in the specific geographic area using the identified listing information;

periodically generating a market rental rate index for the specific geographic area at least in part by, for each home of the plurality of homes in the specific geographic area, applying the trained market rental rate model to attributes of the home to determine a market rental rate for the home;

determining a market rental rate index for the specific geographic area using the market rental rates estimated for each home of the plurality of homes in the specific geographic area; and causing the determined market rental rate index for the specific geographic area to be provided to a user to enable the user to make a determination regarding a home in the specific geographic area.

* * * * *

UNITED STATES PATENT AND TRADEMARK OFFICE
CERTIFICATE OF CORRECTION

PATENT NO. : 10,460,406 B1
APPLICATION NO. : 13/044480
DATED : October 29, 2019
INVENTOR(S) : Humphries et al.

Page 1 of 1

It is certified that error appears in the above-identified patent and that said Letters Patent is hereby corrected as shown below:

On the page 3, in Column 1, under "Other Publications", Line 9, delete "Mathmatical" and insert -- Mathematical --, therefor.

On the page 4, in Column 2, under "Other Publications", Line 65, delete "w w w .csw online.com/" and insert -- www.cswonline.com/ --, therefor.

On the page 5, in Column 1, under "Other Publications", Line 25, delete "w w w .csw online.com/" and insert -- www.cswonline.com/ --, therefor.

On the page 6, in Column 2, under "Other Publications", Line 27, delete "Microstraqtegy," and insert -- Microstrategy, --, therefor.

On the page 7, in Column 1, under "Other Publications", Line 42, delete "Apraisal" and insert -- Appraisal --, therefor.

On the page 7, in Column 2, under "Other Publications", Line 30, delete "Mangement," and insert -- Management, --, therefor.

On the page 10, in Column 2, under "Other Publications", Line 23, delete "Actien" and insert -- Action --, therefor.

Signed and Sealed this
Seventh Day of January, 2020

Andrei Iancu
*Director of the United States Patent and Trademark Office*